United States Patent [19]
Wood et al.

[11] Patent Number: 5,911,362
[45] Date of Patent: Jun. 15, 1999

[54] CONTROL SYSTEM FOR A MOBILE MATERIAL DISTRIBUTION DEVICE

[75] Inventors: John E. Wood, Franklin; Joel T. Morton, Springfield, both of Ill.

[73] Assignee: DICKEY-john Corporation, Auburn, Ill.

[21] Appl. No.: 08/806,610

[22] Filed: Feb. 26, 1997

[51] Int. Cl.$^6$ .................................................. B05B 9/06
[52] U.S. Cl. ............................ 239/1; 239/71; 239/127; 239/155; 239/161
[58] Field of Search .................................. 239/1, 71, 76, 239/146, 147, 155, 156, 157, 124, 161, 163, 172, 127, 318

[56] References Cited

U.S. PATENT DOCUMENTS

| Re. 35,100 | 11/1995 | Monson et al. | 111/130 |
|---|---|---|---|
| 2,774,626 | 12/1956 | Gerbracht | 239/157 |
| 3,163,173 | 12/1964 | Kuntz | 137/93 |
| 3,256,901 | 6/1966 | Kline, Jr. | 137/93 |
| 3,256,902 | 6/1966 | Porter | 137/93 |

(List continued on next page.)

FOREIGN PATENT DOCUMENTS

| 1583794 | 2/1981 | European Pat. Off. . |
|---|---|---|
| 0414045A1 | 2/1991 | European Pat. Off. . |
| 528396 | 2/1993 | European Pat. Off. . |

(List continued on next page.)

OTHER PUBLICATIONS

Midwest Technologies, Inc., The Mid–Tech ISC 3500 Farm Chemical Injection Sprayer Control System, undated sales brochure.
Raven Industries, SCS 440 Installation and Service Manual, undated.
Raven Industries, SCS 460 Installation and Service Manual, undated.
Raven Industries, SCS 700 Installation and Service Manual, undated.
Raven Industries, SCS 750 Chemical Injection System, undated sales brochure.
Micro–Trak Systems, Inc., Flowtrak Sprayer Monitor, 1992 sales brochure.
Micro–Trak Systems, Inc., Sprayer Control Systems, 1991 sales brochure.
Micro–Trak Systems, Inc., Trak–Net, Modular Control and Monotoring Systems Installation and Operator's Manual, 1992.
Hiniker Company, 8100 Control System, undated sales brochure.

*Primary Examiner*—Andres Kashnikow
*Assistant Examiner*—Lisa A. Douglas
*Attorney, Agent, or Firm*—Leydig, Voit & Mayer, Ltd.

[57] ABSTRACT

A control system is provided for efficiently regulating the discharge of material from a mobile material distribution device having a product tank or bin, a boom with at least one boom section, a plurality of outlet ducts (e.g., nozzles and/or distribution ports) associated with each boom section, shut-off valves for selectively enabling each boom section, and a selectively-movable control valve for regulating the flow of material to the boom sections. The control system includes a boom sensing input for monitoring whether the shut-off valves are open or closed (i.e., whether the associated boom sections are enabled or disabled), and a processing system for maintaining a substantially stable pressure level between the control valve and each shutoff valve by positionally locking the control valve at its last controlled position upon receiving a signal from the boom sensing input indicating the shut-off valves are closed. Based information received from the boom sensing input, other feedback sensors, and/or manually entered by the user, the processing system selectively regulates the control valve of the material distribution device so as to precisely regulate the material dispersal rate through the enabled boom sections and to provide the material distribution device with certain useful functions including loading, unloading, and agitation features.

20 Claims, 13 Drawing Sheets

U.S. PATENT DOCUMENTS

| | | | |
|---|---|---|---|
| 3,638,860 | 2/1972 | Carlyon, Jr. | 239/127 |
| 3,819,298 | 6/1974 | Hadnagy et al. | 417/44 |
| 3,942,082 | 3/1976 | Hadnagy | 318/51 |
| 4,005,803 | 2/1977 | Kent | 222/57 |
| 4,015,366 | 4/1977 | Hall, III | 239/69 |
| 4,093,107 | 6/1978 | Allman et al. | 239/74 |
| 4,138,063 | 2/1979 | Batts | 239/168 |
| 4,210,175 | 7/1980 | Daniels et al. | 137/564.5 |
| 4,274,585 | 6/1981 | Lestradet | 239/124 |
| 4,277,022 | 7/1981 | Holdsworth et al. . | |
| 4,341,350 | 7/1982 | Wemmer | 239/312 |
| 4,350,293 | 9/1982 | Lestradet | 239/155 |
| 4,358,054 | 11/1982 | Ehrat | 239/155 |
| 4,370,996 | 2/1983 | Williams | 137/99 |
| 4,392,611 | 7/1983 | Bachman et al. | 239/74 |
| 4,399,871 | 8/1983 | Adkins et al. | 166/325 |
| 4,422,562 | 12/1983 | Rawson | 222/55 |
| 4,433,640 | 2/1984 | Beck et al. | 118/323 |
| 4,460,127 | 7/1984 | Hofmann | 239/126 |
| 4,523,280 | 6/1985 | Bachman . | |
| 4,530,463 | 7/1985 | Hiniker et al. | 239/71 |
| 4,588,127 | 5/1986 | Ehrat | 239/156 |
| 4,609,014 | 9/1986 | Jurjevic et al. | 138/45 |
| 4,630,773 | 12/1986 | Ortlip | 239/1 |
| 4,638,924 | 1/1987 | Newson | 239/127 |
| 4,648,043 | 3/1987 | O'Leary | 364/510 |
| 4,659,013 | 4/1987 | Ledebuhr et al. | 239/8 |
| 4,663,725 | 5/1987 | Truckenbrod et al. . | |
| 4,692,103 | 9/1987 | Anderson | 417/547 |
| 4,714,196 | 12/1987 | McEachern et al. | 239/127 |
| 4,725,039 | 2/1988 | Kolchinsky | 251/129 |
| 4,803,626 | 2/1989 | Bachman et al. | 364/424 |
| 4,805,088 | 2/1989 | Cross et al. | 364/172 |
| 4,817,870 | 4/1989 | Dalton | 239/157 |
| 4,823,268 | 4/1989 | Giles et al. | 364/424 |
| 4,844,396 | 7/1989 | Norton | 248/231 |
| 4,854,505 | 8/1989 | LaVine, Jr. | 239/304 |
| 4,908,746 | 3/1990 | Vaughn . | |
| 4,917,304 | 4/1990 | Mazzei et al. | 239/64 |
| 4,924,418 | 5/1990 | Bachman et al. | 364/550 |
| 5,004,007 | 4/1991 | Johnson et al. | 137/501 |
| 5,007,588 | 4/1991 | Chow et al. | 239/318 |
| 5,011,112 | 4/1991 | Glamm | 251/129 |
| 5,027,293 | 6/1991 | Pung et al. . | |
| 5,034,894 | 7/1991 | Abe . | |
| 5,069,392 | 12/1991 | Wise et al. | 239/675 |
| 5,096,125 | 3/1992 | Wise et al. | 239/675 |
| 5,100,059 | 3/1992 | Englhard et al. | 239/310 |
| 5,186,396 | 2/1993 | Wise et al. | 239/675 |
| 5,193,469 | 3/1993 | Tochor | 111/118 |
| 5,220,876 | 6/1993 | Monson et al. | 111/130 |
| 5,222,324 | 6/1993 | O'Neall et al. | 47/1.7 |
| 5,260,875 | 11/1993 | Tofte et al. | 364/424.07 |
| 5,278,423 | 1/1994 | Wangler et al. | 250/561 |
| 5,304,093 | 4/1994 | Sharp et al. | 454/61 |
| 5,355,815 | 10/1994 | Monson | 111/200 |
| 5,453,924 | 9/1995 | Monson et al. | 364/131 |
| 5,453,939 | 9/1995 | Hoffman et al. . | |
| 5,478,013 | 12/1995 | Ballu . | |
| 5,491,631 | 2/1996 | Shirana et al. . | |
| 5,520,333 | 5/1996 | Tofte | 239/155 |
| 5,521,842 | 5/1996 | Yamada . | |
| 5,634,039 | 5/1997 | Simon et al. . | |
| 5,704,546 | 1/1998 | Henderson et al. | 239/1 |

FOREIGN PATENT DOCUMENTS

| | | |
|---|---|---|
| 0635960A1 | 1/1995 | European Pat. Off. . |
| 2503417 | 10/1982 | France . |
| 2 571 209 | 11/1986 | France . |
| 2 633 156 | 12/1989 | France . |
| 3309920 | 9/1984 | Germany . |
| 3537 082 A1 | 10/1985 | Germany . |
| 193431 | 4/1984 | Hungary . |
| 02265662 | 10/1990 | Japan . |
| 8505948 | 5/1984 | Sweden . |
| 669885 A5 | 4/1989 | Switzerland . |
| 400807 | 2/1974 | U.S.S.R. . |
| 935048 | 6/1982 | U.S.S.R. . |
| 1507457 | 9/1989 | U.S.S.R. . |
| 2 030474 | 4/1980 | United Kingdom . |
| 2 277 891 | 11/1994 | United Kingdom . |
| WO 96/31118 | 10/1996 | WIPO . |

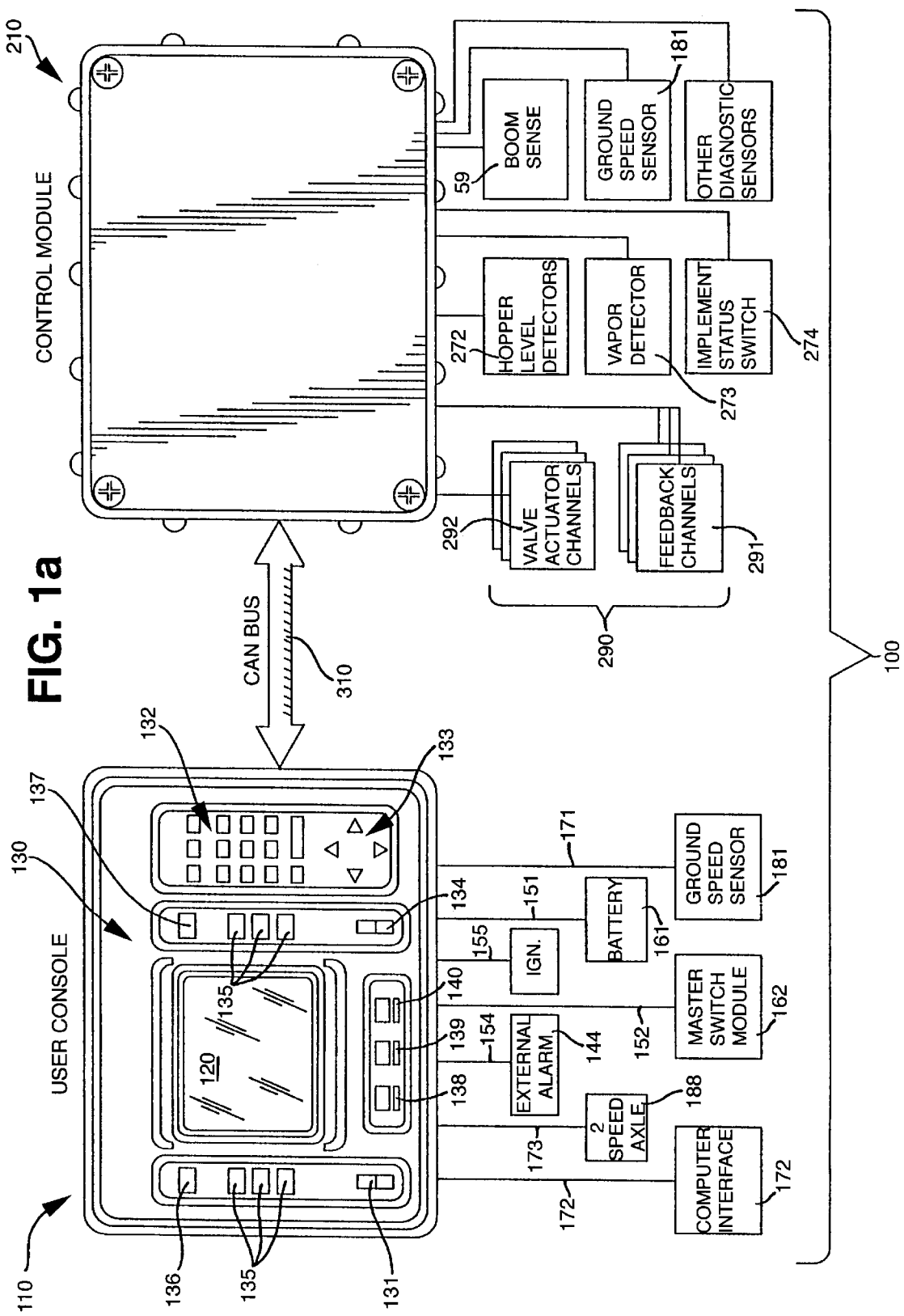

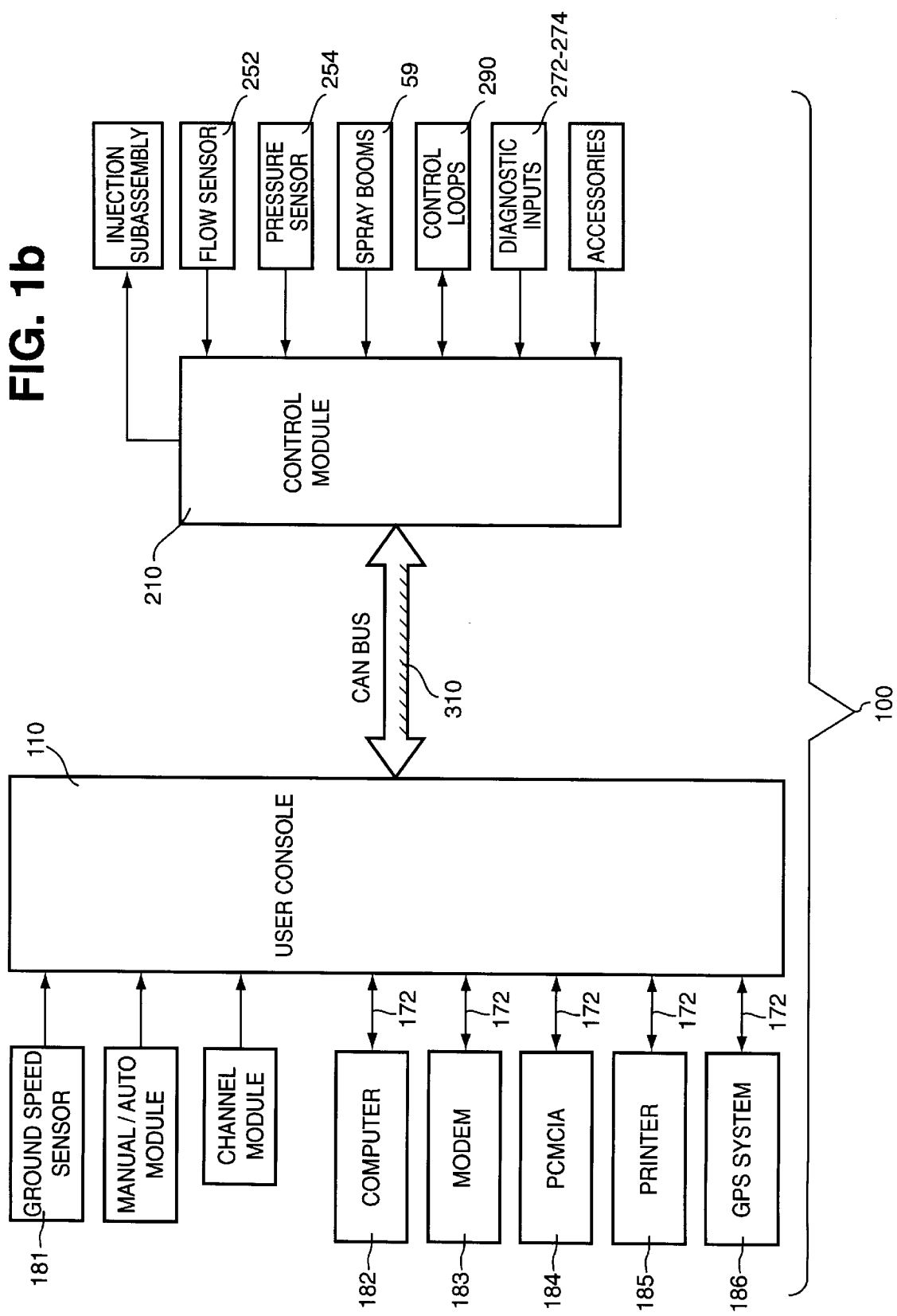

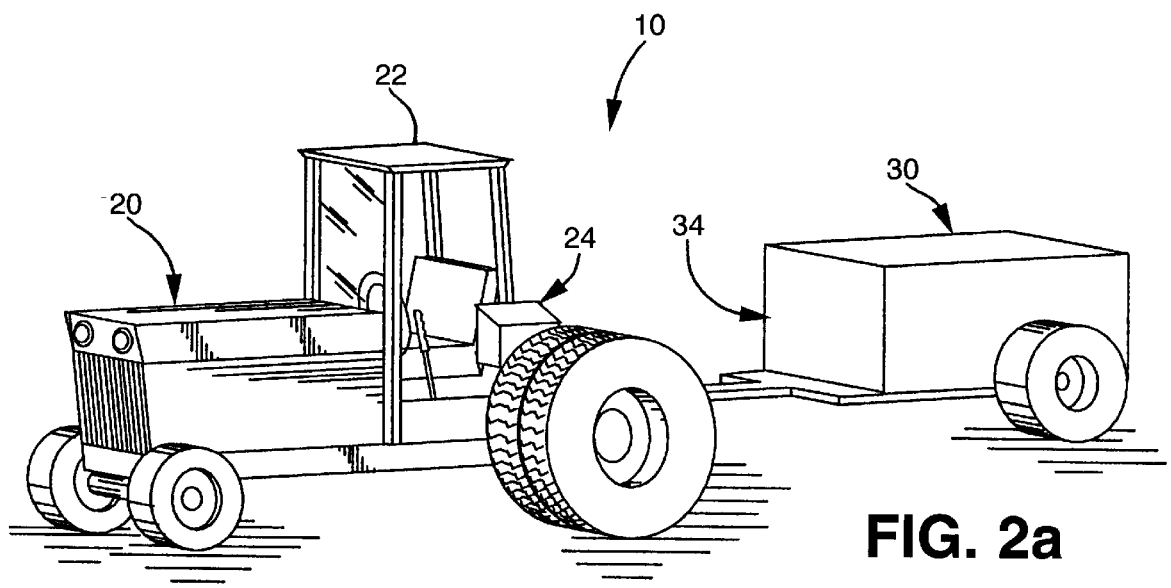
FIG. 2a
FIG. 3
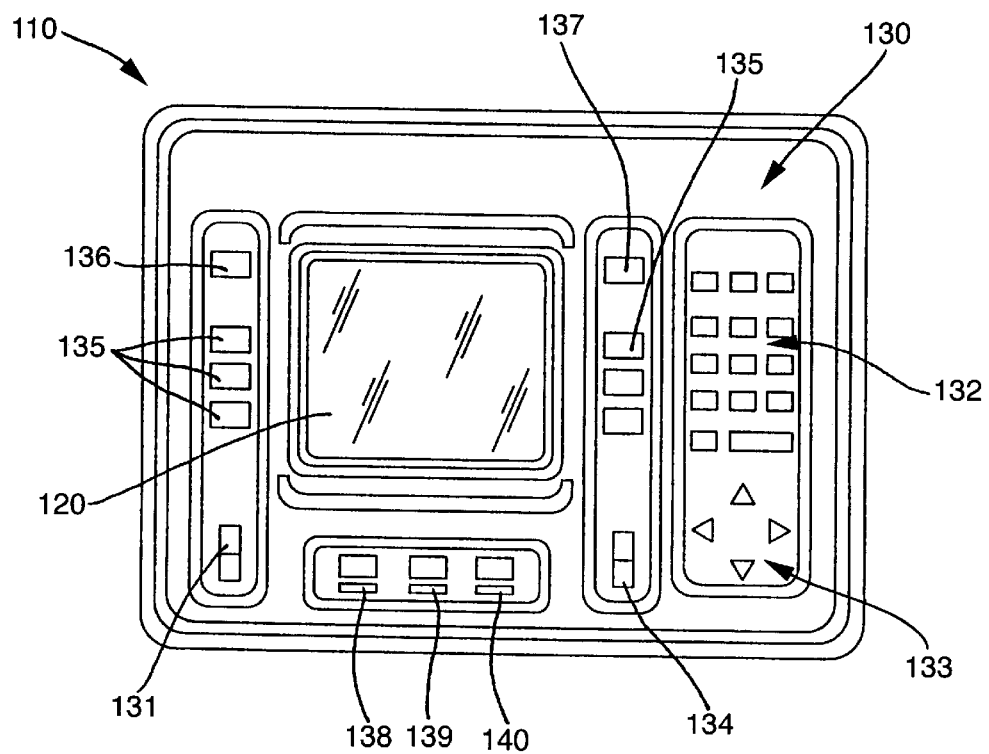

CONTROL SYSTEM FOR A MOBILE MATERIAL DISTRIBUTION DEVICE

FIELD OF THE INVENTION

The present invention relates generally to control systems and, more particularly, to a control system for precisely regulating the discharge of liquid, granular, and/or anhydrous material from a mobile material distribution device such as a farm implement, a public works vehicle, or the like.

BACKGROUND OF THE INVENTION

Control systems for regulating the operation of mobile material distribution devices—including, for example, farm implements such as sprayers and planters, and public works vehicles such as salt spreaders—have been known in the art for some time. Such prior art control systems are usually used to control the rate at which material is dispersed or distributed from the material distribution device. Some such systems, for example, include microprocessor based control systems wherein the ground speed and field position of the material distribution device, as well as the type of soil and other factors, are continually monitored in order to distribute a controlled amount of material throughout the field.

Such prior art control systems, however, suffer from certain drawbacks. For example, prior art control systems frequently cause an inefficient loading and/or unloading of material from the material distribution device.

In particular, prior art control systems generally cause a misapplication of material when the outlet ducts or nozzles of the material distribution device are momentarily closed by the operator. For instance, when the material distribution device is turning around at the end of a field or is traveling across a section of field which should not be treated, the outlet ducts or nozzles of the material distribution device are momentarily closed by the operator in order to prevent the dispersal of material therefrom. This, in turn, causes some prior art control systems to fully open a product flow control valve which results in an over-pressurization of the product distribution line leading to the outlet ducts or nozzles, and also causes an over-application of material when the outlet ducts or nozzles are subsequently reopened by the operator. In other prior art control systems, an automatic override causes the product flow control valve to completely close which results in an under-pressurization of the product distribution line leading to the outlet ducts or nozzles. This under-pressurization, in turn, results in the loss of pressure and the development of air pockets in the product distribution line, and also causes an under-application of material when the outlet ducts or nozzles are subsequently re-opened by the operator.

Another problem associated with prior art control systems is that when the material distribution device is receiving a supply of material from an external supply source such as a nurse truck, an additional pump may be required for loading material into the product tank of the material distribution device. Such a set-up requires numerous plumbing connections which significantly increases the likelihood of material spillage and other accidents.

OBJECTS OF THE INVENTION

Accordingly, a general object of the present invention is to provide a control system for a mobile material distribution device which allows material to be delivered to and discharged from the material distribution device in an efficient and expedient manner.

A related object of the present invention is to provide a control system which regulates the dispersal of liquid, granular, and anhydrous materials based upon the ground speed of the material distribution device and the desired width of material application.

A further related object of the present invention is to provide a control system which maintains a substantially uniform material dispersal rate through open outlet ducts as the material distribution device traverses a field.

Another general object of the present invention is to provide a control system for a mobile material distribution device with a control valve locking feature which prevents the over-pressurization or under-pressurization of the product distribution lines when the outlet ducts or nozzles of the material distribution device are momentarily closed.

A related object of the present invention is to provide a control system which prevents extreme pressure loss and the development of air pockets in the product distribution lines when the outlet ducts or nozzles of the material distribution device are momentarily closed.

A further related object of the present invention is to provide a control system which prevents the misapplication of material when the outlet ducts or nozzles of the material distribution device are momentarily closed and then subsequently re-opened.

An additional object of the present invention is to provide a control system with a loading feature which enables liquid material to be safely and reliably delivered to the material distribution device from an external supply vehicle.

A further object of the present invention is to provide a control system with an unloading feature which provides for the automatic discharge of excess granular material from the material distribution device in a safe and reliable manner.

An additional object of the present invention is to provide a control system with an agitation feature which allows liquid material to be selectively agitated while en route to an application site or while the material distribution device is traversing a field.

Still another object of the present invention is to provide a control system having the foregoing features and characteristics which is reliable, durable, and convenient to use.

These and other objects, features, and advantages of the present invention will become apparent upon reading the following detailed description of a preferred exemplified embodiment and upon reference to the accompanying drawings.

SUMMARY OF THE INVENTION

The present invention accomplishes these objects and overcomes the drawbacks of the prior art by providing a control system for a mobile material distribution device which efficiently, expediently, and reliably regulates the discharge of material therefrom. In particular, the control system may be used with a material distribution device having a supply of material contained within a product tank or bin, a boom with at least one boom section, a plurality of outlet ducts (e.g., nozzles and/or distribution ports) associated with each boom section, shut-off valves for selectively enabling each boom section, and a selectively-movable control valve for regulating the flow of material to the boom sections. The control system of the present invention, in turn, includes a boom sensing input comprised of sensors, lines, or the like for monitoring the operational status of each boom section (i.e., whether the shut-off valves are open or closed and the associated boom sections are enabled or disabled), and a processing system for maintaining a substantially stable pressure level between the control valve and each shut-off valve by positionally locking the control valve at its last controlled position upon receiving a signal from the boom sensing input indicating the shut-off valve associated with each boom section is closed.

In its presently preferred form, the processing system includes a user console, a control module, and a communication link which connects the user console and the control module. More specifically, the user console displays information regarding the control system and the material distribution device and provides a means for entering data into the control system, while the control module receives input signals from the boom sensing input and other feedback sensors associated with the material distribution device and generates output signals which precisely regulate the control valve. A feedback sensor, connected to the control module and disposed along an outlet line leading to the boom in either a downstream or upstream relationship with respect to the control valve, monitors a parameter indicative of material dispersal rate (e.g., pressure and/or flow), while a speed sensor, connected to either the control module or the user console, monitors the ground speed of the material distribution device. Based upon information received from the boom sensing input, the feedback sensor, the ground speed sensor, and/or manually entered by the user, the control system selectively regulates the control valve of the material distribution device so as to precisely control the material dispersal rate through the enabled boom sections and to provide the material distribution device with certain useful functions including loading, unloading, and agitation features.

BRIEF DESCRIPTION OF THE DRAWINGS

In the drawings, wherein similar reference numerals denote similar elements throughout the several views:

FIG. 1A is a schematic diagram of one embodiment of a control system according to the present invention;

FIG. 1B is a block diagram of the control system depicted in FIG. 1A;

FIG. 2A is a perspective environmental view of a representative mobile material distribution device having an attached product distribution implement and utilizing the control system shown in FIGS. 1A and 1B;

FIG. 3 is a face plan view of the user console of the control system depicted in FIG. 1A;

Figure 2B:
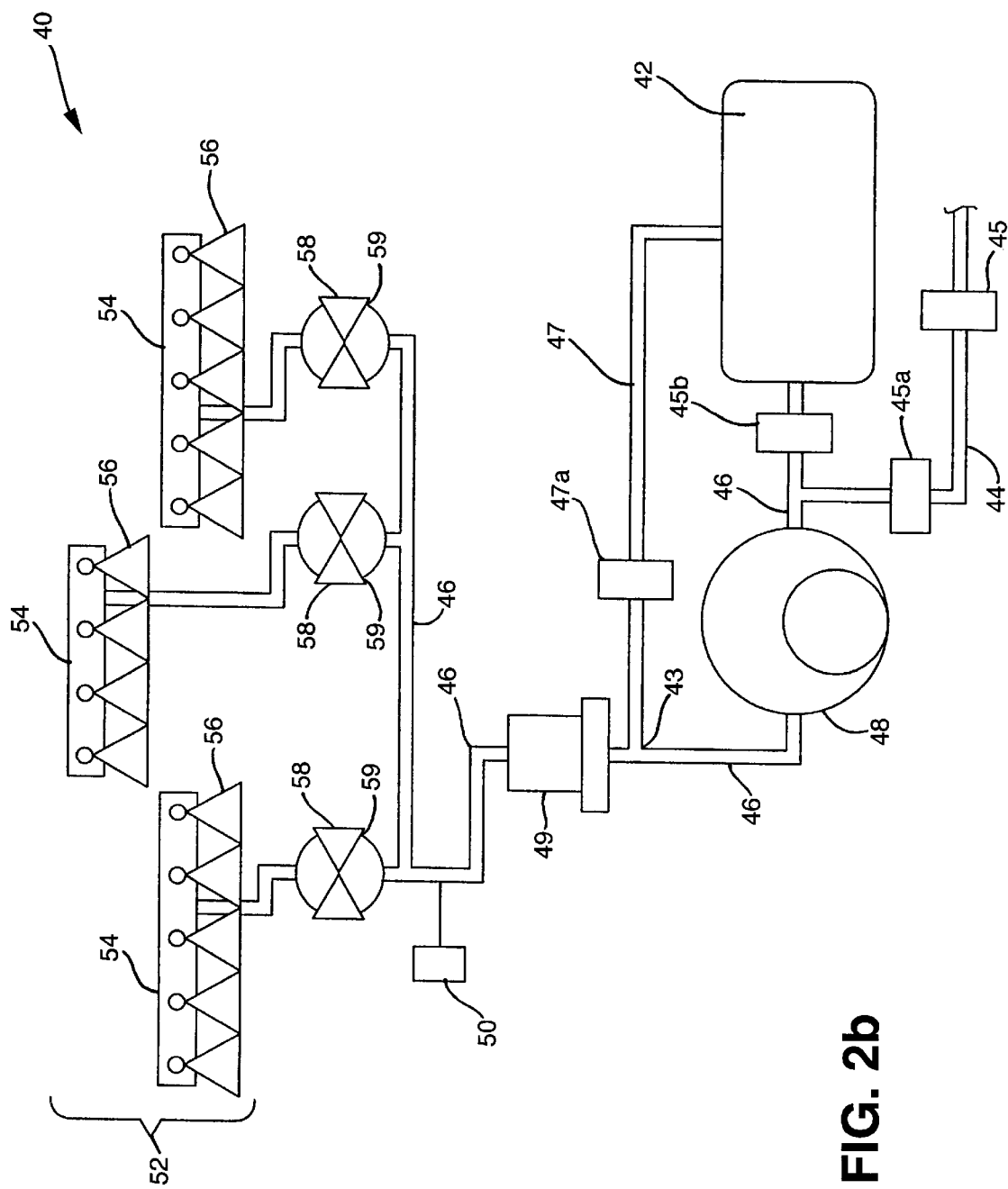
FIG. 2B is a schematic diagram of a first product distribution implement for dispensing liquid material.

While the present invention will be described and disclosed in connection with certain preferred embodiments and procedures, the intent is not to limit the present invention to these specific embodiments. On the contrary, the intent is to cover all such alternatives, modifications, and equivalents that fall within the spirit and scope of the present invention as defined by the appended claims.

DETAILED DESCRIPTION OF THE PREFERRED EMBODIMENT

Turning now to the drawings, a control system constructed in accordance with the present invention is generally designated by reference numeral 100. By connecting certain feedback sensors and actuators associated with a material distribution device 10—such as that depicted in FIG. 2A—to the control system 100 depicted in FIGS. 1A and 1B, and by inputting certain characteristics concerning the properties and operating characteristics of the material distribution device 10, the control system 100 of the present invention may be used to monitor and control the operation of virtually any material distribution device 10 having substantially any application.

For example, when properly configured, the control system 100 of the present invention may be used to monitor and control the operation of various material distribution devices 10 including farm implements such as liquid sprayers, granular distributors, anhydrous ammonia applicators, planters, and the like, and public works vehicles such as salt spreaders. Indeed, the control system 100 may be used to monitor and control the application of a wide variety of materials including, for example, liquid and granular fertilizers, pesticides, herbicides, fungicides, chemicals, anhydrous ammonia, sand, salt, cinders, seeds, and the like. In fact, the inventive control system 100 may be used to monitor and control multiple material distribution devices 10 at different times simply by substituting certain component parts and/or by changing certain feedback connections. In the embodiments disclosed herein, the control system 100 is referred to in the context of distribution devices 10 distributing material over a "field." The term "field" herein means not only a farm field, but also any area of ground over which the distribution device 10 may traverse in distribution material including, for example, roadways.

In view of this flexibility, the control system 100 of the present invention is provided with two primary components, namely, a user console 110 and a control module 210. As discussed in greater detail below, the user console 110 is primarily an input/output device which not only provides visual information concerning the performance and operation of the control system 100 and the attached material distribution device 10, but also provides a user-friendly means for inputting information into the control system 100. The control module 210, in contrast, is the processing or command center for the control system 100. In operation, the control module 210 receives information from various feedback sensors (e.g., pressure transducers, flowmeters, application rate sensors, ground speed sensors, product level sensors, and the like) regarding the operation of the material distribution implements 30, transmits performance information concerning both the control system 100 and the material distribution implement 30 to the user console 110 for display, and generates output signals which precisely regulate one or more product flow distribution control valves of the material distribution device 10. Together, the user console 110 and the control module 210 provide a universal modular control system 100 which is capable of controlling a wide variety of machinery.

Although the inventive control system 100 is shown and described herein as a multi-component system comprised the user console 110 and the control module 210, it will be readily appreciated by those skilled in the art that these two components may alternatively be assimilated into a single housing or unit without departing from the scope or spirit of the present invention.

As shown in FIG. 2A, the material distribution device 10 may comprise a tractor or prime mover 20, which may have a cab 22, and one or more attached product distribution implements 30. Alternatively, the material distribution device 10 may be constructed as a single structure (not shown). In the former case, the control module 210 may either be disposed on the prime mover 20 (e.g., at position 24) or on the distribution implement 30 (e.g., at position 34). The product distribution implement 30 has been shown as a non-descript block in FIG. 2A so to emphasize the universality of the inventive control system 100. Those skilled in the art, however, will understand that the non-descript block of FIG. 2A may represent any material distribution implement 30 that a user wishes to monitor and control.

Figure 2C:
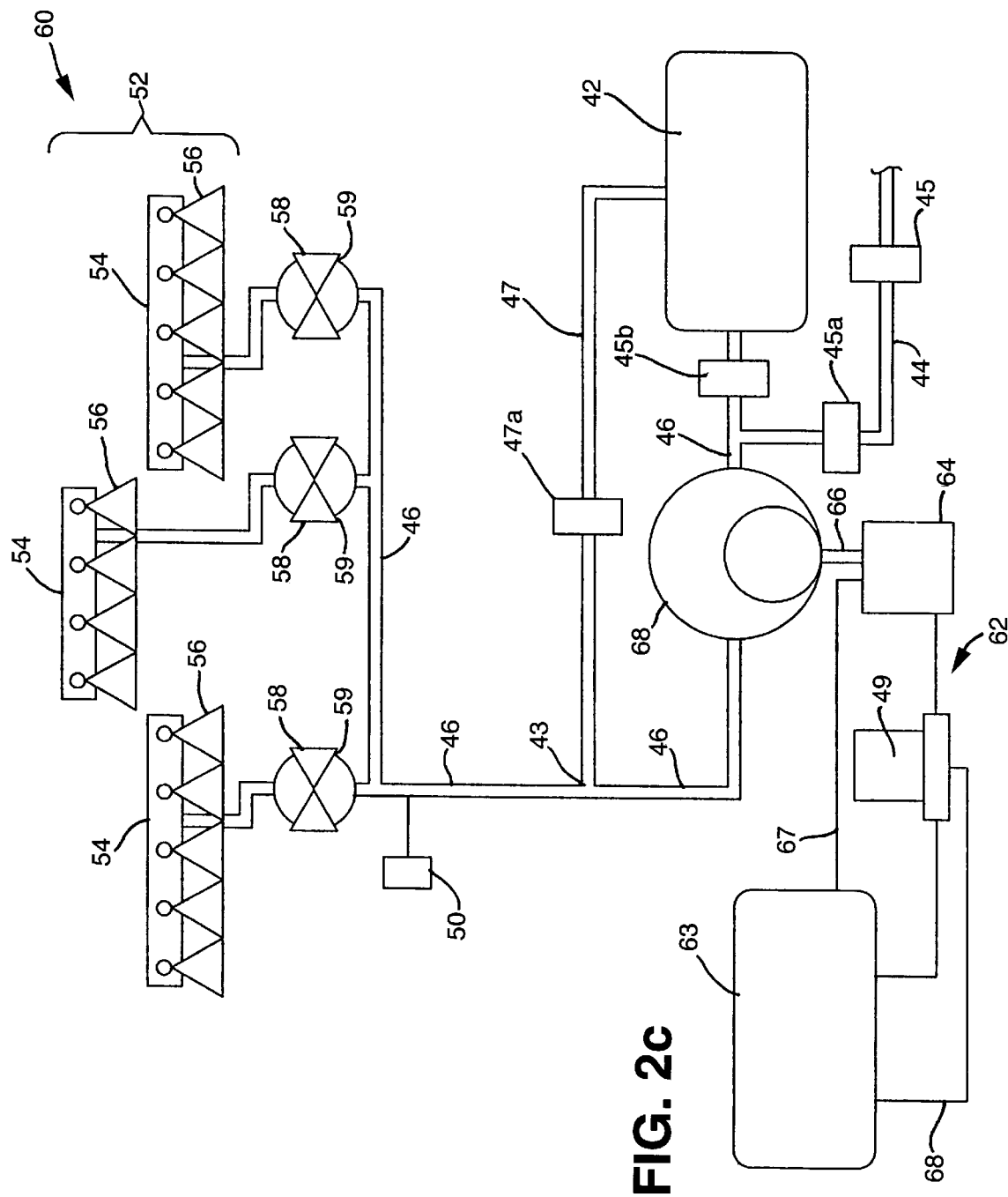
FIG. 2C is a schematic diagram of a second product distribution implement for dispensing liquid material.
Figure 2D:
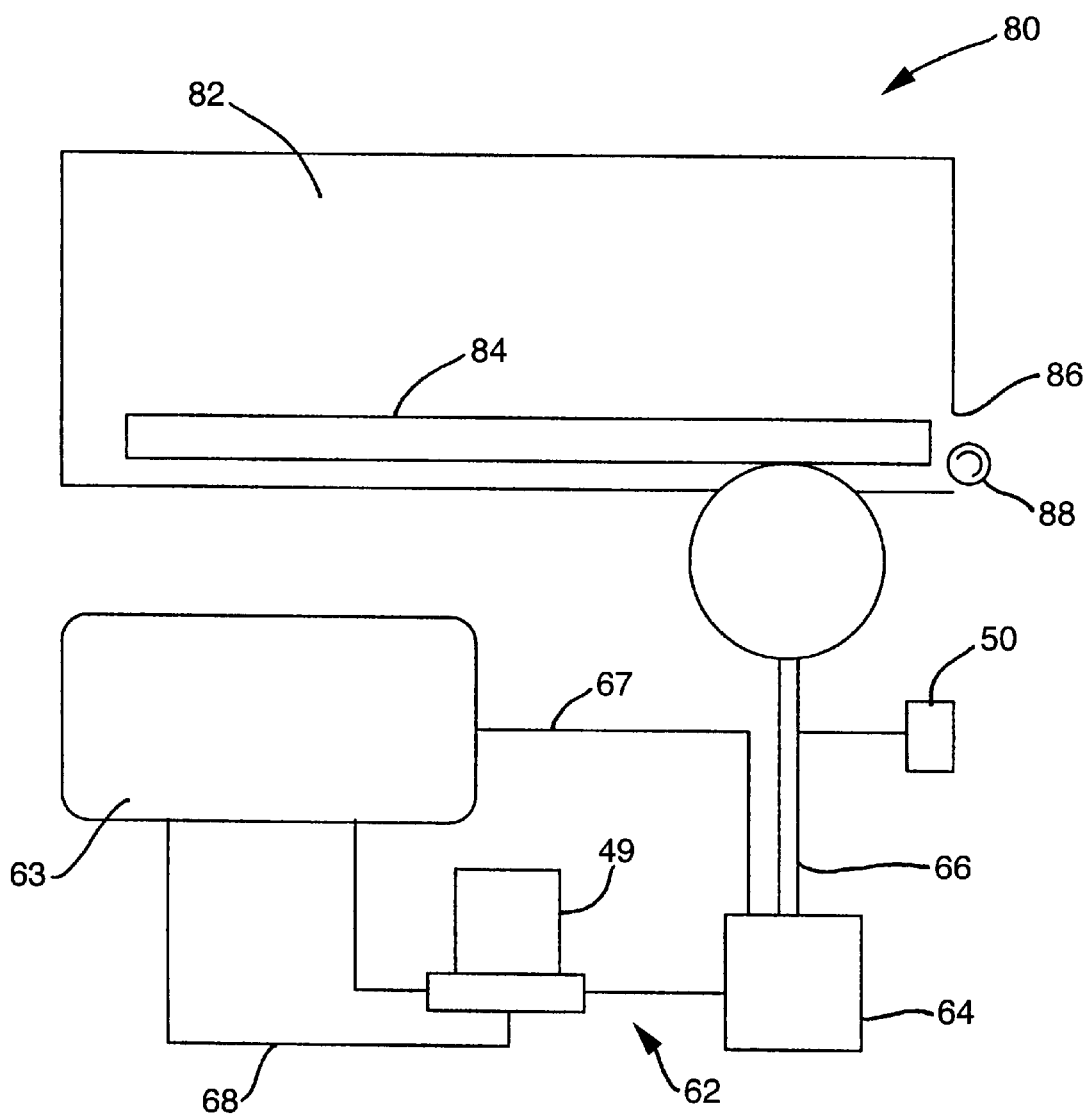
FIG. 2D is a schematic diagram of a third product distribution implement for dispensing granular material.
Figure 4:
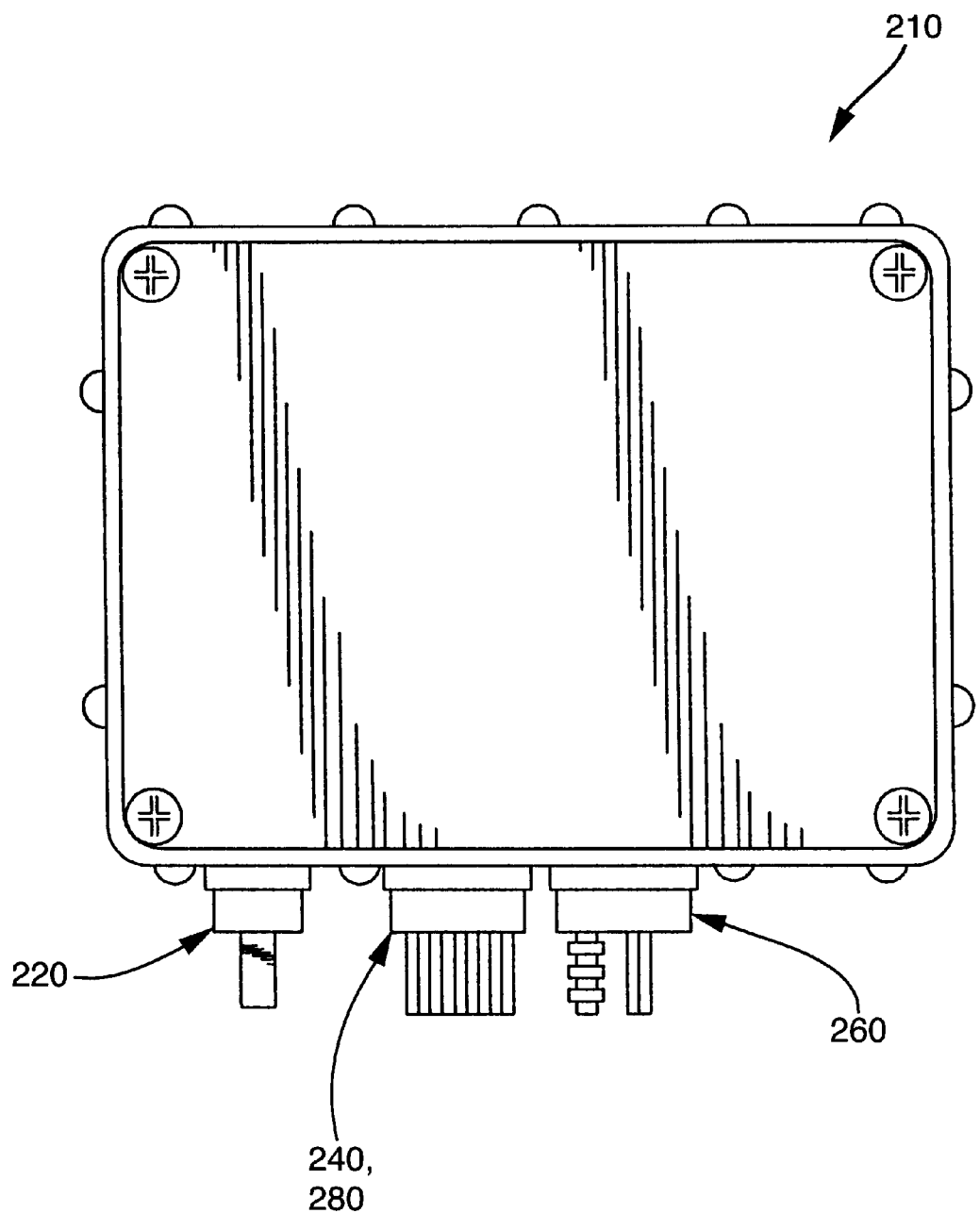
FIG. 4 is a top plan view of the control module of the control system depicted in FIG. 1A.

For example, the product distribution implement 30 shown in FIG. 2A may comprise any or all of the material distribution systems 40, 60, and 80 shown in FIGS. 2B, 2C, and 2D, respectively. As will be discussed in greater detail below, the first and second material distribution systems 40 and 60 are specifically adapted to distribute liquid material (e.g., liquid fertilizers, pesticides, herbicides, fungicides, chemicals, and the like), while the third material distribution system 80 is specifically adapted to distribute granular material (e.g., sand, salt, cinders, seeds, granular fertilizers, and the like).

As shown in FIG. 2B, the first exemplary material distribution system 40 has a product supply path which includes a storage tank 42 for containing a supply of liquid material, an outlet or product distribution line 46 for supplying liquid material to one or more downstream booms 52, a pump 48 for pressurizing liquid material in the product distribution line 46, an inlet line 44 for supplying liquid material to the product supply path, and a return line 47 for connecting the outlet line 46 and the storage tank 42. A plurality of valves 45, 45a, and 45b also provided for selectively opening and closing the inlet and outlet lines 44 and 46, depending on the desired operation. In particular, a manual supply valve 45 is disposed along the inlet line 44, a second valve 45a is also disposed along the inlet line, and a third valve 45b is disposed along the outlet line 46 between the product tank 42 and the pump 48. Of course, with such a set-up, manual valve 45 would be redundant. In addition, although a pair of valves 45a and 45b are shown along inlet line 44, it will be appreciated by those skilled in the art that a single two-way valve (not shown), disposed at the junction of the inlet and outlet lines 44 and 46, may alternatively be used for selectively opening either the inlet line 44 or the outlet line 46. A sparge valve 47a is also provided along the return line 47 for regulating the flow of material therethrough.

As is customary in the art, the booms 52 include a plurality of outlet ducts disposed along their length for distributing material therefrom. Those skilled in the art will appreciate that booms 52 equipped with nozzles 56 (FIGS. 2B and 2C) are designed to dispense liquid material, while booms 52 equipped with distribution ports 86 (FIG. 2D) are designed to dispense granular material. In any event, for the purpose of this application, the term "outlet ducts" shall include nozzles 56 for dispensing liquid material, distribution ports 86 for dispensing granular material, and/or any other ducts through which liquid, granular, and/or anhydrous material may be distributed.

Since booms 52 may be very long, sometimes as long as one-hundred feet, they generally include numerous outlet ducts. Typically, these outlet ducts are arranged in groups, as boom sections 54, so that each boom section 54 may be turned on and off individually. As schematically illustrated in FIG. 2B, for example, each boom section 54 includes an associated shut-off valve 58, such as a solenoid valve, for selectively activating and deactivating individual boom sections 54. Although the booms 52 disclosed herein dispenses one type of material, it will be appreciated by those skilled in the art that different booms 52 may be provided to dispense dissimilar materials (e.g., one boom 52 may distribute fertilizer, while another boom 52 may distribute a pesticide). of course, with each additional material, another product supply path will also be required.

In order to supply liquid material to the product tank 42 on an as-needed basis, the inlet line 44 of the first distribution system 40 may be attached to an external supply source such as a supply truck (not shown). Alternatively, a hose (not shown) may be provided for linking the external supply source to an opening (not shown) located at or near the top of the product tank 42. In prior art systems, a supplementary pump (not shown) is commonly used to pump liquid material from the external supply source, through the inlet line 44, and into the supply tank 42. In the first material distribution system 40, however, pump 48 may be advantageously used to pump liquid material from the external supply source, through the inlet line 44, through the outlet line 46, through the return line 47, and into the supply tank 42 without the use of a supplementary pump. As will be described more fully below, this loading operation is accomplished simply by closing shut-off valves 58, opening valves 45 and/or 45a, closing valve 45b, opening valve 47a, and energizing pump 48. In such use, pump 48 may either be driven by an independently-operated motor (not shown), or by a power take-off shaft (not shown) from the prime mover 20. In addition, the pump 48 may either be constant-speed pump or a variable-speed pump and may take almost any form including, for example, a centrifugal pump, a positive displacement pump, an electric pump, a hydraulic pump, a reciprocating pump, a rotary pump, or the like.

In keeping with an important aspect of the present invention, the first material distribution system 40 further includes an actuator valve or product distribution control valve 49 which regulates the material dispersal rate through the outlet ducts or nozzles 56 of the activated boom sections 54 by selectively opening and closing product distribution line 46. In practicing the invention, the control valve 49 may either be disposed in the outlet line 46, as shown in FIG. 2B, or be disposed in the return line 47 (not shown) in place of the sparge valve 47a. In either event, the material dispersal rate through the outlet ducts or nozzles 56 is regulated by selectively opening or closing the control valve 49 a desired amount so as to divert the appropriate flow of material to the activated boom sections 54. In fact, the material dispersal rate of all three of the material distribution systems 40, 60, and 80 are regulated by a similar control valve 49. Indeed, by controlling this valve 49, the control system 100 of the present invention may be used to selectively regulate the material dispersal rate of all three material distribution systems 40, 60, and 80. In addition, although the control valves 49 described herein are characterized as servo-based hydraulic-type valves, it will be readily appreciated by those skilled in the art that other valve-types may alternatively be used—including, for example, pulse-width modulated ("PMW") valves—without departing from the scope or spirit of the present invention.

As shown in FIG. 2B, the first material distribution system 40 also includes one or more feedback sensors 50 (e.g., pressure transducers, flowmeters, and/or application rate sensors) for monitoring a parameter indicative of material dispersal rate. These feedback sensors 50 are preferably disposed along the product distribution line 46 in either a downstream or upstream relationship with respect to the actuator valve 49. For example, if the feedback sensor 50 comprises a pressure transducer 254, it is preferably located downstream of the actuator valve 49 and upstream of the shut-off valves 58, as shown in FIGS. 2B and 2C. If, however, the feedback sensor 50 comprises a flowmeter 252, it is preferably located upstream of the actuator valve 49 (e.g., between the pump 48 and the actuator valve 49). A series of boom sensors or lines 59 are also provided for monitoring the status of each shut-off valve 58 (i.e., whether these valves 58 are open or closed) and the associated boom sections 54 (i.e., whether these boom sections 54 are enabled or disabled). In use, these boom sensors or lines 59 may either directly sense the status of the valves 58, such as by measuring the position of an operable component of the valve 58 itself, or indirectly sense the status of the valves 58, such as by monitoring the position of the switches which control the valves 58 or by measuring the voltage of an electrical line driving the valve 58.

In operation, the control system 100 of the present invention continuously receives status information from the feedback sensors 50, the boom sensors 59, and other sensors (e.g., ground speed sensors). As will be discussed in greater detail below, the control system 100 utilizes this status information to automatically adjust the actuator valve 49 so as to precisely regulate the material dispersal rate through the outlet ducts or nozzles 56. Indeed, with all three of the material distribution systems 40, 60, and 80, the control system 100 of the present invention utilizes similar feedback information to adjust the actuator valve 49.

Like the first material distribution system 40, the second material distribution system 60 shown in FIG. 2C includes an inlet line 44 with a manual supply valve 45, a storage tank 42 for storing a supply of liquid material, an outlet or product distribution line 46 with pump 68, a return line 47 which connects the outlet line 46 and the storage tank 42, a boom 52 with a plurality of boom sections 54, a plurality of outlet ducts in the form of nozzles 56 arranged along each boom section 54, and a shut-off valve 58 for selectively activating and deactivating each boom section 54. Valves 45a and 45b (or a single two-way valve disposed at the junction of the inlet line 44 and the outlet line 46), and sparge valve 47a are also provided for. The pump 68 of the second material distribution system 60, however, is connected to a hydraulic loop designated generally by reference numeral 62. As shown in FIG. 2C, this hydraulic loop 62 includes a driven hydraulic motor 64 with an associated drive shaft 66, a hydraulic fluid return line 67, a source of hydraulic pressure 63 such as a pump driven by the power take-off shaft of the prime mover 20, an actuator valve 49, and a return line 68 from the actuator valve 49 to the reservoir of the source of hydraulic pressure 63. In operation, the actuator valve 49 regulates the hydraulic motor 64 while the drive shaft 66 of the hydraulic motor 64 drives the pump 68. In this way, the pump 68 of the second material distribution system 60 is a hydraulically-controlled, variable-speed pump.

As with the first material distribution system 40, the actuator valve 49 of the second material distribution system 60 is selectively regulated by the control system 100 of the present invention based upon status information received from feedback sensors 50 and boom sensors 59 as well as any user inputs. The operation of the second material distribution system 60 is slightly different than the operation of the first material distribution system 40, however, because the actuator valve 49 is positioned in the hydraulic loop 62 and not in the product distribution line 46. In particular, when the actuator valve 49 is selectively adjusted by the control system 100, the drive shaft 66 of the hydraulic motor 64 rotates at a proportionally different speed which causes the pump 68 to operate at a proportionally different speed. This change in pump operating speed, in turn, causes a proportional change in the material flow rate through the outlet line 46, the activated boom sections 54, and the affiliated nozzles 56.

The third material distribution system 80 is a hydraulically-controlled material distribution system for granular materials. Like the second material distribution system 60 shown in FIG. 2C, the third material distribution system 80 shown in FIG. 2D includes a hydraulic loop 62 having a source of hydraulic pressure 63, an actuator valve 49, a hydraulic motor 64 with an associated drive shaft 66, a return line 67, and a pressure relief line 68. In use, the actuator valve 49 regulates the hydraulic motor 64 and the rotational speed of the drive shaft 66. As shown in FIG. 2D, the third material distribution system 80 also includes a product hopper or bin 82 for containing a supply of granular material or the like, a product conveyor belt 84 for transporting granular material towards one or more outlet ducts or distribution ports 86 of the product bin 82, and a product spreader 88 arranged in or near the distribution ports 86 for controlling the dispersal of granular material therefrom. The product spreader 88 preferably includes one or more spinners which, upon rotation, provide a substantially uniform dispersal of granular material from the distribution ports 86. A feedback sensor 50, such as a tachometer or the like, is also provided for monitoring the rotational speed of drive shaft 66 or any other parameter indicative of material dispersal rate.

In operation, the material dispersal rate through the distribution ports 86 of the product bin 82 is dependent upon the speed of the product belt 84 which, as described above, is regulated by the drive shaft 66 of the hydraulic motor 64. Since the actuator valve 49 controls the hydraulic motor 64, the actuator valve 49 indirectly controls both the speed of the product belt 84 and the resulting material dispersal rate through the distribution ports 86. Indeed, as will be discussed in further detail below, the actuation control valves 49 of all three material distribution systems 40, 60, and 80 are regulated by the control system 100 of the present invention.

In order to minimize the amount of wiring present in the cab 22 of the prime mover 20, the control module 210 of the inventive control system 100 is preferably located outside of the cab 22. In fact, since the control module 210 is the only component of the control system 100 which is directly connected to the actuator 49 and feedback sensors 50 and of the material distribution device 10, the only portion of the control system 100 which must be disposed within the cab 22 is the user console 110. In this way, the vast majority of the wiring required for electrical communication may be located exterior to the cab 22 by positioning the control module 210 outside of the cab 22 and by connecting the control module 210 to the user console 110 with a single cable connection, such as a CAN bus 310 (e.g., a "Controller Area Network" bus per Bosch specification CAN 2.0). With this advantageous set-up, the CAN bus 310 is the only connecting cable that must enter the cab 22. Although, as presently contemplated, the CAN bus 310 is the preferred means for coupling the user console 110 to the control module 210, those skilled in the art will understand, of course, that other communication means such as fiber optic cables, infrared or radio frequency links, or the like may alternatively be employed without departing from the scope or the spirit of the present invention.

Those skilled in the art will also appreciate that, notwithstanding the foregoing explanation of the advantages of mounting the control module 210 outside of the cab 22, the control module 210 may alternatively be positioned within the cab 22 without departing from the scope or the spirit of the present invention. In addition, those skilled in the art will further appreciate that the disclosed universal control system 100 may alternatively be assimilated into a single housing or unit or may be used with a cab-less material distribution device 10 without departing from the scope and spirit of the present invention.

In any event, the CAN bus 310 preferably comprises two detachable portions 153 and 221 which may be used to selectively couple the control module 210 to the user console 110. This ability to separate these two components 110 and 210 is particularly advantageous when the control module 210 is secured on a detachable product distribution implement 30, (e.g., near position 34 in FIG. 2A), because it permits a user to detach the implement 30 from the prime mover 20 in order to use the prime mover 20 with a second implement (not shown). For example, if the second implement is also provided with a control module 210 (generally in the vicinity of position 34 in FIG. 2A), the second implement may be used with the prime mover 20 simply by connecting the control module 210 of the second implement to the user console 110 of the prime mover 210 via the CAN bus 310. Thus, if a user employs a single user console 110 and more than one control module 210, with each control module 210 being mounted on a different product distribution implement 30, switching between implements 30 does not require extensive wiring changes. Instead, it is only necessary to connect the appropriate control module 210 to the CAN bus connector 153 of the user console 110 and to mechanically secure the selected product distribution implement 30 to the prime mover 20.

Those skilled in the art will also appreciate that a user may still switch between different product distribution implements 30 with the inventive control system 100 even if only one control module 210 is employed. For example, if the control module 210 is mounted on the prime mover 20, a user may switch between detachable implements 30 by disconnecting all of the wiring associated with the first implement from the control module 210, and attaching that wiring to the second implement. After the second implement has been identified to the control system 100 via the user console 110, the control system 100 will be ready to monitor and control the second implement.

As mentioned above, the user console 110 is an input/output device which communicates with the control system 100 of the present invention. To this end, the user console 110 is preferably provided with a display device portion 120 for providing visible status information concerning the control system 100 and the attached product distribution implement 30, an input panel portion 130 with a plurality of input devices 131–140 for entering information to the control system 100, and an annunciator (not shown) for producing audible sounds. In the preferred embodiment, the display device 120 of the user console 110 comprises a liquid crystal display ("LCD") panel. However, those skilled in the art will readily appreciate that other display devices capable of providing visual information, such as cathode ray tubes, plasma display panels, or the like, may alternatively be employed without departing from the scope or the spirit of the present invention. In addition, although the user console 20 depicted in FIGS. 1A, 3, and 5 includes a single input panel having a plurality of input devices 131–140, any number of such input panels and devices may alternatively be employed without departing from the scope or spirit of the invention.

In any event, in the preferred embodiment, the input devices of the input panel 130 comprise: (1) an on/off power switch 131; (2) an alpha numeric keypad 132 for entering data; (3) a set of directional keys 133 for moving a cursor (not shown) about the visual display panel 120 and for incrementing/de-incrementing certain variables; (4) a contrast control switch 134 for changing the contrast of the LCD panel 120; (5) a plurality of function keys 135 for selecting from one or more menus displayed on the LCD panel 120; (6) an escape key 136; (7) a help key 137; and (8) three mode selection keys 138, 139, and 140 whose functions will be described in greater detail below. The input panel 130 may also be connected to an external alarm 144 which alerts the vehicle operator to certain warning conditions.

In order to process information received through the input panel 130, the user console 110 is provided with a microprocessor (not shown) having associated memory. The memory is preferably divided into a non-volatile memory portion such as a PROM for storing programmed instructions directing the operation of the microprocessor, and an addressable volatile memory portion for storing temporary data during operation. The programmed instructions contained within the non-volatile memory control the operation of the microprocessor, dictate the images and information which are displayed on the LCD panel 120, and ascribe meanings to various keystrokes made through the input devices 131–140.

Figure 5:
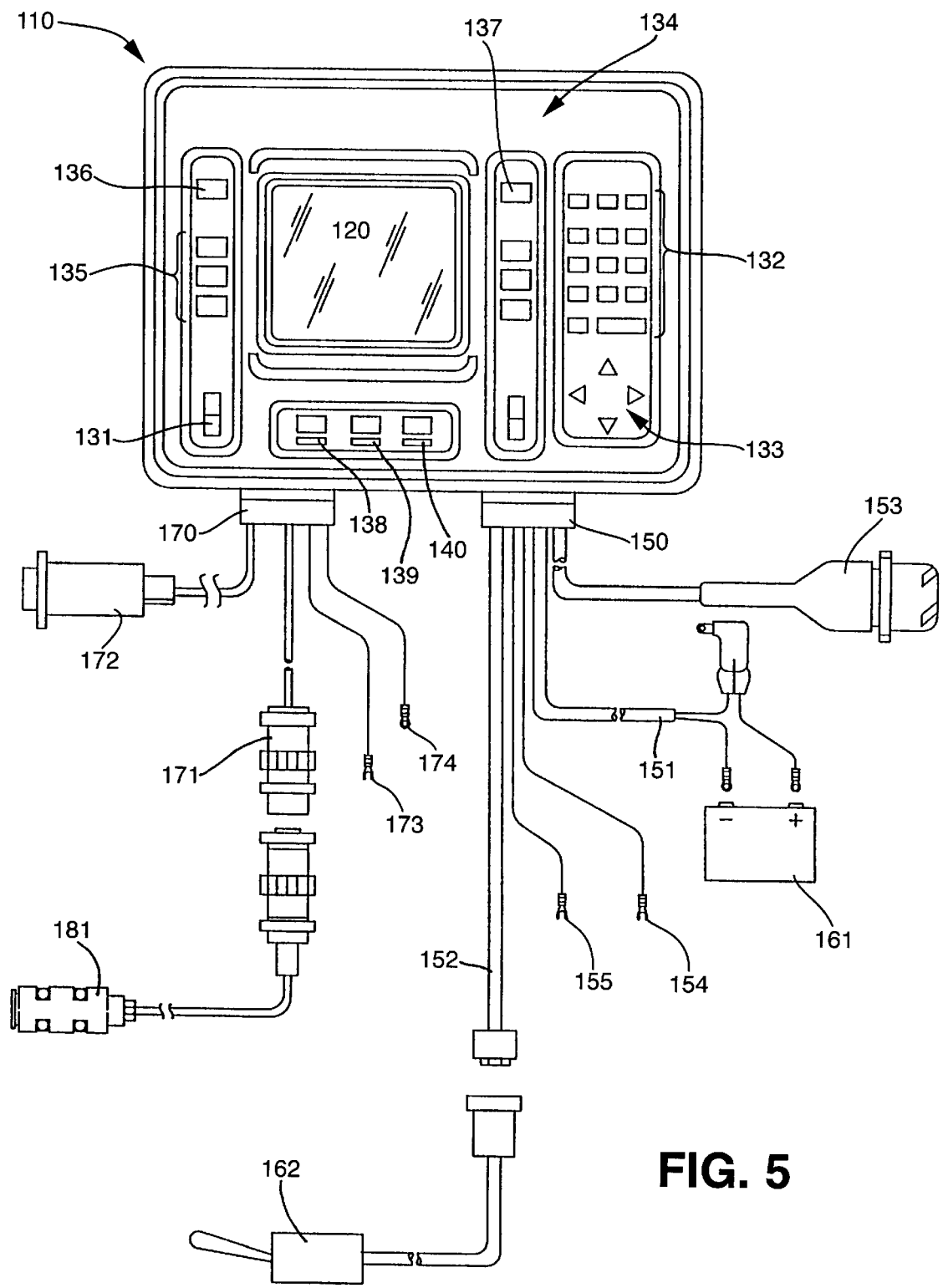
FIG. 5 is a representative schematic wiring diagram for the user console depicted in FIGS. 1A and 3.

The microprocessor of the user console 110 is operatively connected to various input and output ports which, for organizational purposes, are preferably grouped into two harness assemblies 150 and 170. As shown in FIG. 5, these two harness assemblies 150 and 170 include a plurality of interface ports which link the user console 110 to various peripheral devices. For example, the first harness 150 includes: (1) power lead 151 which connects to an external battery or power supply 161, such as the battery of the prime mover 20; (2) cable 152 which couples to a master switch module 162; (3) connector 153 which attaches to connector 221 of the control module 210 to provide the CAN bus 310 communication link between the user console 110 and the control module 210; (4) ignition switch cable 154 which is preferably hard wired to the ignition system of the prime mover 20; and (5) auxiliary wire 155 which may be connected to an external alarm 144. The purpose of the master switch module 162 will be discussed in greater detail below.

The second harness 170 is provided with four cable connections 171–174 which connect to various peripheral devices, communication ports, and sensors. Each cable connection 171–174, will now be addressed in turn.

As shown in FIG. 5, the first cable connection 171 is attached to a ground speed sensor 181 such as a radar device or drive shaft pick-up. Alternatively, the ground speed sensor 181 may be connected to the control module 210 as will be discussed in greater detail below. In either event, the ground speed sensor 181 provides the user console 110 with information regarding the speed of the material distribution device 10.

The second cable connection 172 is a general purpose input/output cable, such as an RS-232 communications port, which may be attached to any of a number of peripheral devices. For example, as shown in FIG. 1B, the RS-232 port 172 may be coupled to a personal computer 182 to provide remote control operation of the control system 100 and the material distribution device 10. The personal computer 182 may also be used to perform certain diagnostic procedures and to upload and/or download data or programmed instructions (i.e., software) for use by the control system 100. As shown in FIG. 1B, the RS-232 port 172 may be directly connected to an onboard computer 182 (e.g., a portable computer disposed within the cab 22), indirectly coupled to an off-board computer (e.g., a desktop computer) via a modem link 183, or indirectly connected to an onboard computer via a PCMCIA modem card 184. The RS-232 port 172 may also be advantageously coupled to a printer 185 or other suitable output device. With such a set-up, the control system 100 of the present invention may be used to conveniently print out information concerning the control system 100 and/or the material distribution device 10 it controls (i.e., configuration summary reports), as well as information concerning treatment of the field (i.e., application acreage reports).

As a further example, the RS-232 port 172 may also be coupled to a global positioning system ("GPS") 186 to permit the control system 100 of the present invention to automatically interface with a system having mapped recording data concerning the characteristics of the surface being serviced by the material distribution device 10. Such access may be utilized for the purpose of recording the distribution of material by the product distribution implement 30 or providing the system 100 with variable set-point information. For example, in one embodiment, the RS-232 port 172 provides the control system 100 with site specific set-point information from the GPS system 186 which causes the material distribution device 10 to distribute exactly the desired amount of material at each specific location in the field. As one skilled in the art will appreciate, port 172 may be used in other ways to provide the control system 100 of the present invention with remotely-provided control information. For example, a system for sampling the soil or other site-specific parameters could generate, in near real-time, a control signal, such as a set-point signal, and such a signal could be convey to the control system 100 via port 172 to control and vary system operation as a function of such parameters.

In any event, the settings of the RS-232 port 172 are preferably selected by the user from a list of pre-defined settings which enables the port 172 to communicate with a wide variety of devices. The settings of the RS-232 port 172 are preferably set by microprocessor of the user console 110 based upon the user's selections.

As shown in FIGS. 1A and 5, the third cable connection 173 is preferably connected to a sensor 188 which monitors the operable axle of a two axle vehicle, while the fourth cable connection 174 is a ground wire which connects to a grounding surface such as the chassis of the prime mover 20.

The first and second harness assemblies 150 and 170 are coupled to the microprocessor via interface electronics (not shown). The interface electronics include conventional power conditioning circuitry (not shown) to step the supply voltage from the battery of the prime mover 20 to a level appropriate for use by the control system 100. It also includes conventional analog to digital converters and digital to analog converters for converting the input and output signals to a format appropriate for use by the microprocessor and/or the peripheral devices. All of this electronic interface circuitry is conventional and known to those skilled in the art.

As discussed briefly above, the control module 210 is the processing or command center for the control system 100. As shown in FIGS. 1A, 1B, 4, and 6, the control module 210 is operatively connected to various actuation drivers and sensors which both monitor and control the performance of the material distribution device 10. In particular, the control module 210 is coupled to feedback sensors 50 (e.g., pressure transducers 254, flowmeters 252, and/or application rate sensors 253) which monitor the material dispersal rate from the product distribution implement(s) 30, and to other sensors (e.g., boom sensors 59, product level sensors 272, and/or application rate sensors 253) which monitor various operating characteristics of the material distribution device 10. The control module 210 is also coupled to actuation drivers (e.g., valve actuators) for the control valves 49 which control the material dispersal rate through the outlet ducts of the attached product distribution implement(s) 30.

Like the user console 110, the heart of the control module 210 is a microprocessor (not shown). This microprocessor is provided with programmed instructions stored in an associated program memory. As explained in greater detail below, these programmed instructions permit the microprocessor of the control module 210 to monitor and control a plurality of feedback channels coupled to virtually any material distribution device 10 based on a variety of inputs including, for example, the ground speed of the device 10 (set-point as manually fixed or adjustable, or as specified by the GPS 186 or other peripheral device), and other variables including the specific needs of a treated surface. The programmed instructions also permit the microprocessor to monitor the control system 100 and the material distribution device 10 for errors and, to classify any such errors into categories or types which provides the user of the control system 100 with audible and visual indications of the nature of occurring errors.

The microprocessor of the control module 210 is further programmed to monitor the status of the boom sections 54 of the attached product distribution implement 30. In particular, the microprocessor provides the control module 210 with an indication as to which boom sections 54 are "on" and which boom sections 54 are "off" by monitoring whether the shut-off valves 58 of the monitored boom sections 54 are open or closed. The microprocessor may also provide a mapping system, such as a GPS 186, with information indicating what areas of the surface have been treated and with how much material. For example, the microprocessor may be programmed to monitor the operation of the nozzles 56 disposed on a monitored boom 58 in calculating the exact amount of material which should be supplied to that boom 58 to achieve a desired material distribution, and to provide a mapping system, such as a GPS 186, with information concerning the operation of the nozzles 56 so as to accurately record the material distributed by each nozzle 56.

The microprocessor of the control module 210 is also provided with an addressable random access memory ("RAM") (not shown) for storing data during operation. As those skilled in the art will appreciate, this memory may be implemented in a variety of ways without departing from the scope of the present invention. For example, the memory may be implemented by a hard disk drive, a floppy disk drive, or memory chips (not shown) depending upon the degree of volatility desired. Similarly, the program memory may be implemented by any of a variety of well known devices including one or more EPROM chips and/or a CD-ROM device. In the preferred embodiment, however, the program memory is implemented by a FLASH and the RAM is implemented by a Static RAM.

As with the user console 110, the control module 210 includes a plurality of input and output ports which, for organizational purposes, are preferably grouped into four vehicle harness assemblies designated by reference numerals 220, 240, 260, and 280, respectively. The microprocessor of the control module 210 is coupled to these four harness assemblies 220, 240, 260, and 280 via interface electronics (not shown) which are implemented similarly to the interface electronics of the user console 110. As such, the interface electronics of the control module 210 include conventional analog to digital converters and digital to analog converters for converting the input and output signals transmitted to and from the microprocessor into a format appropriate for use by the microprocessor and/or the controlled material distribution device 10. All of this electronic interface circuitry is conventional and well known to those skilled in the art.

Figure 6:
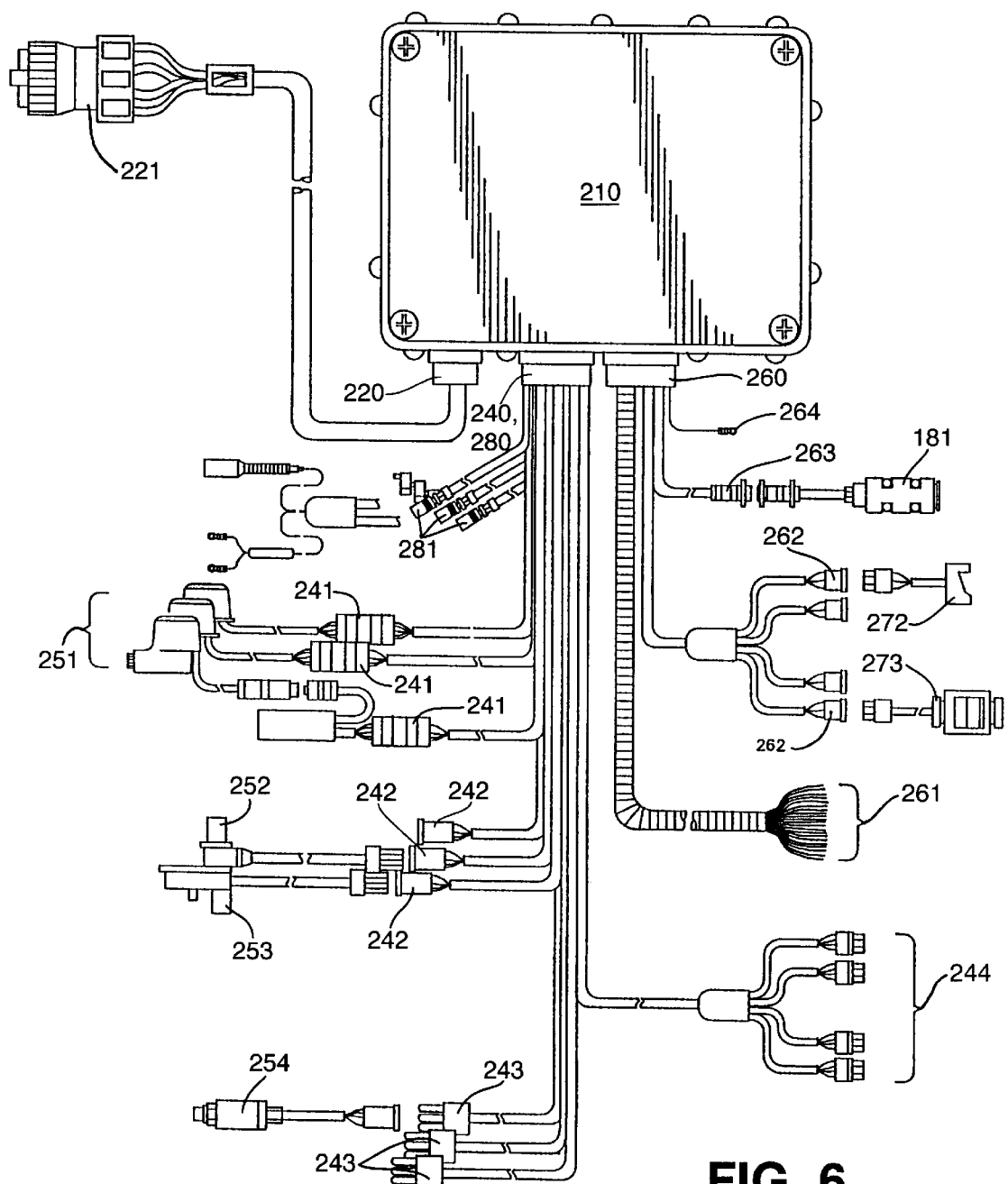
FIG. 6 is a representative schematic wiring diagram for the control module depicted in FIGS. 1A and 4.

As best shown in FIG. 6, these four harness assemblies 220, 240, 260, and 280 include a plurality of interface ports which link the control module 210 to the user console 110, to the actuation drivers of the control valves 49, to the feedback sensors 50 (e.g., pressure transducers 254, flowmeters 252, and/or application rate sensors 253), and to various other sensors (e.g., boom sensors 59, product level sensors 272, and/or vapor detectors 273). Each harness assembly 220, 240, 260, and 280 will now be discussed in turn.

The first harness assembly 220 of the preferred control module 210 is a CAN bus harness assembly having a modular connector 221. By attaching this modular connector 221 to connector 153, a convenient CAN bus 310 communication link is provided between the control module 210 and the user console 110.

The second harness assembly 240 is a channel harness assembly which includes four sets of connective cables 241, 242, 243, and 244, respectively. Properly configured, the first set of cables 241 are connected to actuation drivers 251 for the product distribution control valves 49 (which may or may not be included in the same housing as the valves 49 themselves); the second set of cables 242 are connected to various digital feedback sensors 50 such as flowmeters 252 and application rate sensors 253; the third set of cables 243 are connected to various analog feedback sensors 50 such as pressure transducers 254; and the fourth set of cables 244 are connected to various analog diagnostic devices such as tank level sensors (not shown).

The third harness assembly 260 is a boom harness assembly which includes a first set of leads 261, a second set of leads 262, a cable connector 263, and a ground wire 264. Properly configured, the first set of leads 261 interface with up to sixteen boom sensors 59 and/or an implement status switch 274; the second set of leads 262 interface with various digital diagnostic devices including, for example, a hopper level sensor 272 and a vapor detector 273; the cable connection 263 optionally connects to the ground speed sensor 181 (in lieu of the first cable connection 171 of the second harness assembly 170 of the user console 110, if desired); and the ground wire 264 attaches to a grounding surface such as the chassis of the prime mover 20.

Finally, the fourth harness assembly 280 is an auxiliary harness assembly having a plurality of connectors 281. In use, these connectors 281 are connected to an external power source, such as the battery 161 of the prime mover 20, so as to supply power to the actuation drivers 251 of the product distribution control valves 49.

As mentioned above, the user console 110 also includes input connection 171 for use with ground speed sensor 181. However, coupling the ground speed sensor 181 to the user console 110 may require the presence of an additional lead within the cab 22. In order to avoid cluttering the cab 22 with such a lead, the ground speed sensor 181 may alternatively be connected to the control module 210 via input connector 263 if, for example, the ground speed sensor cable is not required to be in the cab 22 for the vehicle speedometer or for other purposes. In any event, depending upon the user's preference, the ground speed sensor 181 may either be coupled to the user console 110 or the control module 210 without departing from the scope or spirit of the present invention.

Because of these four harness assemblies 220, 240, 260, and 280, the control module 210 of the present invention is capable of sensing numerous feedback signals indicative of material dispersal rate, including three digital feedback signals (from flowmeters 252, application rate sensors 253, and the like), three analog feedback signals (from pressure transducers 254 and the like), four digital diagnostic signals (from vapor detectors 273, hopper level sensors 272 and the like), and four analog diagnostic signals (from tank level sensors (not shown), pressure sensors 254, and the like). The control module 210 is also capable of sensing an input speed signal from the ground speed sensor 181, up to sixteen input status signals from the boom sensors 271, and an application error signal from each actuation driver 251 of the control valves 49.

Based upon these input and feedback signals, the control module 210 generates output signals which precisely regulate one or more actuator drivers 251 of the product distribution control valves 49. In this way, the material dispersal rates of the attached product distribution implements 30 are precisely controlled as the material distribution device 10 traverses a field. In fact, the control module 210 of the illustrated embodiment is capable of controlling up to three different actuator drivers 251.

As shown in FIG. 1A, the control module 210 is preferably coupled to a set of feedback channels 291 and to a set of actuator channels 292 to form a set of separate feedback control loops 290. More specifically, each feedback channel 291 contains a feedback sensor 50 (i.e., a pressure transducer 254, a flowmeter 252, or an application rate sensors 253) for monitoring a parameter indicative of the material dispersal rate, and each actuator channel 292 contains an actuator driver 251 for selectively controlling a product distribution control valve 49. Although the control loops 290 shown in FIG. 1A denotes a three channel system, it will be readily appreciated by those skilled in the art that virtually any number of channels may alternatively be used without departing from the scope or spirit of the present invention.

In operation, each control loop 290 continuously or periodically receives feedback signals from the connected feedback sensor 50 regarding the material dispersal rate. Each control loop 290 also receives input signals from the ground speed sensor 181 regarding the ground speed of the material distribution device 10 and from the boom sensors 59 regarding the status of the monitored boom sections 54 (i.e., whether the shut-off valves 58 for the monitored boom sections 54 are open or closed). Based upon this information, and any set-point changes made by the user or by a peripheral device such as the GPS 186, the control system 100 of the present invention causes the feedback control loop 290 to transmit an output signal to the appropriate actuator driver 251 which, in turn, causes the desired product distribution control valve 49 to selectively open or close an appropriate amount so as to precisely regulate the resulting material dispersal rate through the boom sections 54. Indeed, as long as the ground speed of the material distribution device 10 remains within a pre-specified range, the feedback control loop 290 accurately controls the material dispersal rate.

The set-up shown in FIG. 6, for example, provides the control system 100 with three different feedback control loops or channels 290. In this embodiment, a first control loop is configured for granular material (e.g., sand, salt, cinders, seeds, granular fertilizers, and the like) by having its feedback channel 291 connected to application rate sensor 253, a second control loop is configured for anhydrous ammonia by having its feedback channel 291 connected to flowmeter 252, and a third control loop is configured for liquid material (e.g., liquid fertilizers, pesticides, herbicides, fungicides, chemicals, and the like) by having its feedback channel 291 connected to pressure transducer 254. In other embodiments, the flowmeter 252 may alternatively be used for liquid material, if desired, either instead of or in conjunction with a pressure transducer 254.

As discussed briefly above, master switch module 162 is connected to the user console 110 via cable 152. As depicted in FIG. 5, the master switch module 162 may be an independent structure which may be conveniently mounted anywhere within the cab 22 for frequent use by the vehicle operator. Alternatively, the master switch module 162 may be integrally formed with the user console 110. In either case, the master switch module 162 preferably comprises a single switch which enables all of the control loops 290 of the control system 100 to be selectively activated or deactivated by the vehicle operator. In particular, the master switch module 162 has three operating positions—namely, "auto", "off", and "manual"—which correspond, respectively, to the "auto", "off", and "manual" modes of the control system 100. Each of these modes will now be explained in turn.

During automatic operation, the master switch module 162 should be in the "auto" mode. In this mode, the control module 210 monitors and controls the material distribution device 10 coupled to the feedback control loops 290, based upon variables selected by the vehicle operator such as ground speed of the material distribution device 10. While in the "auto" and other modes, the control module 210 also monitors the operation of any connected accessories and implement sections such as boom sections 54 or spinners, and automatically provides the user console 110 with information concerning these activities. The user console 110, in turn, displays the monitored readings on the display device 120 for consideration by the vehicle operator. Although system configurations and most variables may not be changed while in the "auto" mode, the operator may turn channels on and off and manually increment and decrement set points "on the fly" via the directional keypad 133. The operator may also interrupt the "auto" mode by flipping the master switch module 162 away from the "auto" position.

When the master switch module 162 is flipped to the "off" position, all of the feedback control loops 290 are disabled, and the discharge of material from the material distribution device 10 is halted. The control system 100, however, continues to monitor the input devices of the input panel 130 for data input by the vehicle operator. More specifically, by stepping through various user friendly menus and entering appropriate data, the operator may: identify the characteristics of the material distribution device 10; perform diagnostic procedures; print out formal reports; and perform other desirable housekeeping and configuration procedures.

Finally, when the master switch module 162 is switched to the "manual" mode, the control system 100 uses predefined default values as inputs in order to open all of the product distribution control valves 49 of the attached material distribution device 10 a pre-defined amount. The "manual" position generally used only when the material distribution device 10 is moving at very slow speeds. This mode is useful, for example, in dumping or otherwise flushing excess material from the material distribution device 10. To avoid inadvertent dumping of excessive amounts of material, the "manual" position is preferably spring-loaded for momentary contact. As such, the operator must intentionally hold the master switch 162 in the "manual" position or the switch 162 will automatically bounce out of that position.

When the master switch module 162 is in the "auto" position or mode, the control system 100 of the present invention is programmed to provide a substantially uniform material dispersal rate per unit area as the material distribution device 10 traverses a field. In particular, the inventive control system 100 automatically adjusts the product distribution control valve 49 based upon the ground speed of the material distribution device 10, as indicated by the ground speed sensor 181, and the material application width, as indicated by the boom sensors 59. For example, if some of the boom sections 54 are selectively deactivated by closing particular shut-off valves 58, the control system 100 will automatically adjust the product distribution control valve 49 so that a substantially uniform material dispersal rate is achieved through the open boom sections 54. Put another way, the material dispersal rate through the open boom sections 54 will remain virtually unchanged vis-a-vis the material dispersal rate through these same boom sections 54 prior to closing the shut-off valve 58 and deactivating the boom section 54.

If, however, all of the boom sections 54 are deactivated—e.g., when the material distribution device 10 is turning around at the end of a field or is traveling across a non-treated section of the ground—the inventive control system 100 has a control-valve locking feature which positionally locks the product distribution control valve 49 in its last controlled position (i.e., its position prior to closing the shut-off valves 58 and deactivating the boom sections 54). By "locking" the control valve 49 in its last controlled position, a substantially stable pressure level is maintained in the product distribution line 46 between the control valve 49 and the shut-off valves 58. This, in turn, advantageously prevents the development of air pockets in the product distribution line 46, as well as the misapplication (i.e., either the over-application and the under-application) of material through the boom sections 54 once the shut-off valves 58 are eventually re-opened.

Figure 7:
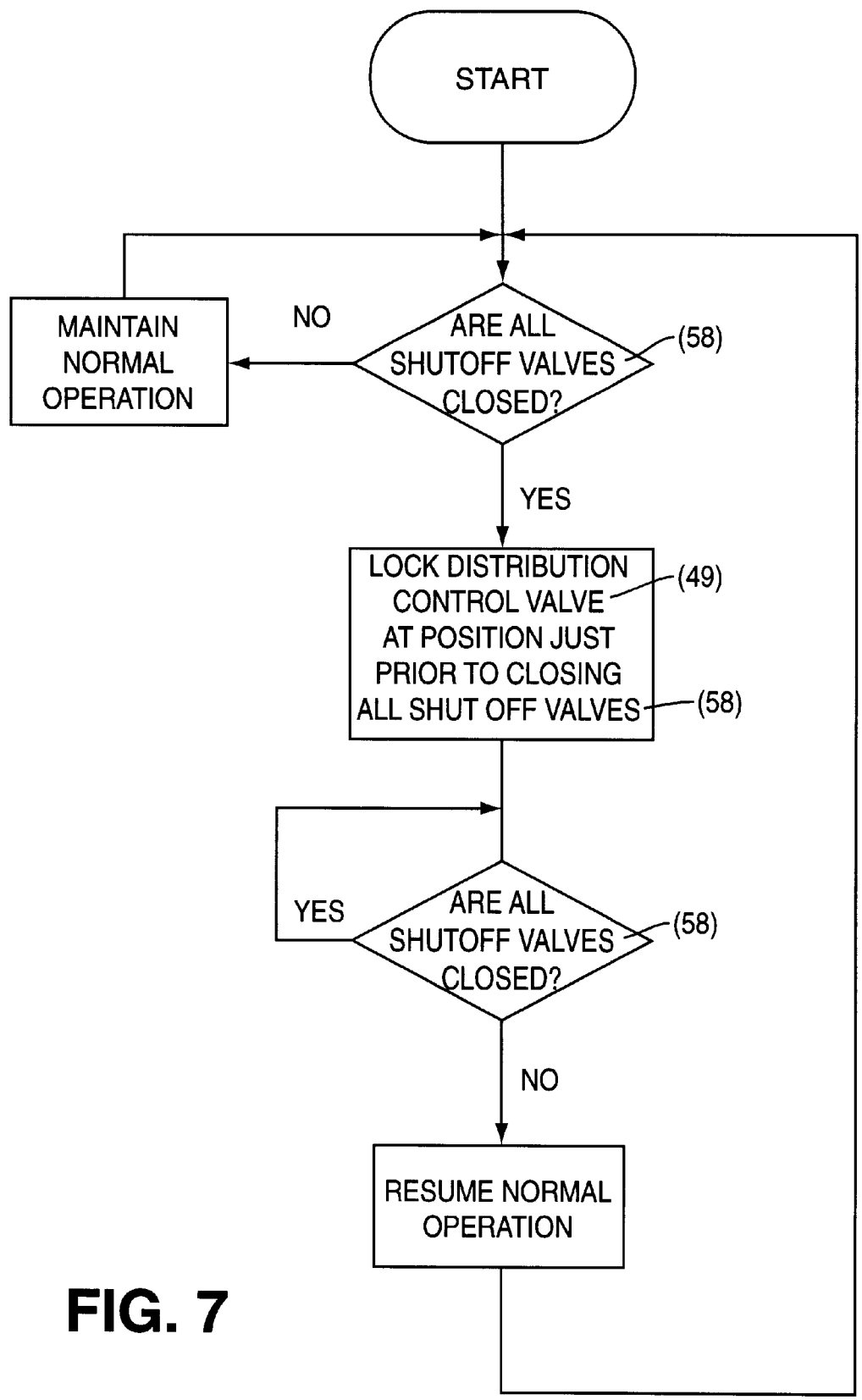
FIG. 7 is a flow chart illustrating a control valve locking feature of the present invention.

In operation, this control valve locking feature of the inventive control system 100 functions in the following manner and provides the following desirable results. When all of the shut-off valves 58 are closed by the operator, the control module 210 receives a corresponding signal from the boom sensors 59 which is interpreted as a material application width which is equal to "zero" (i.e., the effective operating boom width is interpreted as "zero" because all of the shut-off valves 58 are closed). Upon receiving such a signal, the inventive control system 100 transmits an output signal to the actuation driver 251 which positionally locks the product distribution control valve 49 at its last controlled position. By locking the control valve 49 in this way, a substantially stable pressure level in the product distribution line 46 is maintained after the shut-off valves 58 are closed. In this regard, the control valve locking feature of the inventive control system 100 disregards the automatic override of prior art control systems (i.e., programming which completely closes the control valve 49 when all of the shut-off valves 58 have been closed by the operator). In any event, when one or more of the shut-off valve 58 are eventually re-opened by the operator, the material dispersal rate through the re-activated boom sections 54 will resume at a level substantially equal to the material dispersal rate just prior to shut-off valve 58 closure and boom 52 deactivation. The function just described can be implemented in the software of the control system 100 and, conceptually, is illustrated by the flow chart of FIG. 7.

Thus, in accordance with several important objects of the present invention, this control valve locking feature of the inventive control system 100 prevents a substantial increase or decrease of pressure in the product distribution line 46 when all of the shut-off valves 58 are closed, prevents the formation of air pockets in the product distribution line 46, and prevents or substantially lessens the over-application and the under-application of material once the shut-off valves 58 and the associated outlet ducts or nozzles 56 are eventually re-opened.

In keeping with another important aspect of the present invention, the inventive control system 100 also has a loading feature which enables liquid material to be safely, reliably, and conveniently delivered to the product tank 42 of material distribution device 10 from an external supply vehicle such as a nurse truck (not shown). In fact, once the external supply source is connected to the inlet line 44 of the product distribution implement 30, the pump 68 of the product distribution implement 30 may then be used to conveniently draw liquid material from the external supply source and into the supply tank 42 simply by closing shut-off valves 58, opening valves 45 and/or 45a, closing valve 45b, opening valve 47a, and energizing the pump 68. In the case of a two-way valve (not shown) disposed at the junction of the inlet and outlet lines 44 and 46, liquid material may be conveniently drawn into the product tank 42 simply by closing shut-off valves 58, opening valve 45, positioning the two-way valve such that the inlet line 44 is open and the outlet line 46 is closed, and energizing the pump 68. If, on the other hand, the control valve 49 is located along the return line 47 in place of the sparge valve 47a, liquid material may be conveniently drawn into the product tank 42 simply by closing shut-off valves 58, opening valves 45 and/or 45a, closing valve 45b, opening control valve 49, and energizing pump 48. In any event, the supply tank 42 may be conveniently and rapidly supplied with liquid material without the assistance of supplementary pumps or auxiliary plumbing.

To initiate this loading feature, the operator simply enters the set-up mode of the control system 100 by activating the appropriate mode selection key 138–140 of the user console 110 and then selects the "loading" option from the menu displayed on the LCD panel 120 of the user console 110. Once selected, the control system 100 sends a warning indicating an improper operating condition, and transmits an output signal to the actuation driver 251 instructing it to completely open the product distribution control valve 49. Once the control valve 49 is completely open, an error signal is sent to the control module 210 indicating a wide-open control valve 49 condition. In response to this error signal, the control system 100 closes the valve 49 slightly to remove this error condition. This loading process continues until the operator selects the "stop" option (i.e., when the storage tank 42 is full).

Figure 8:
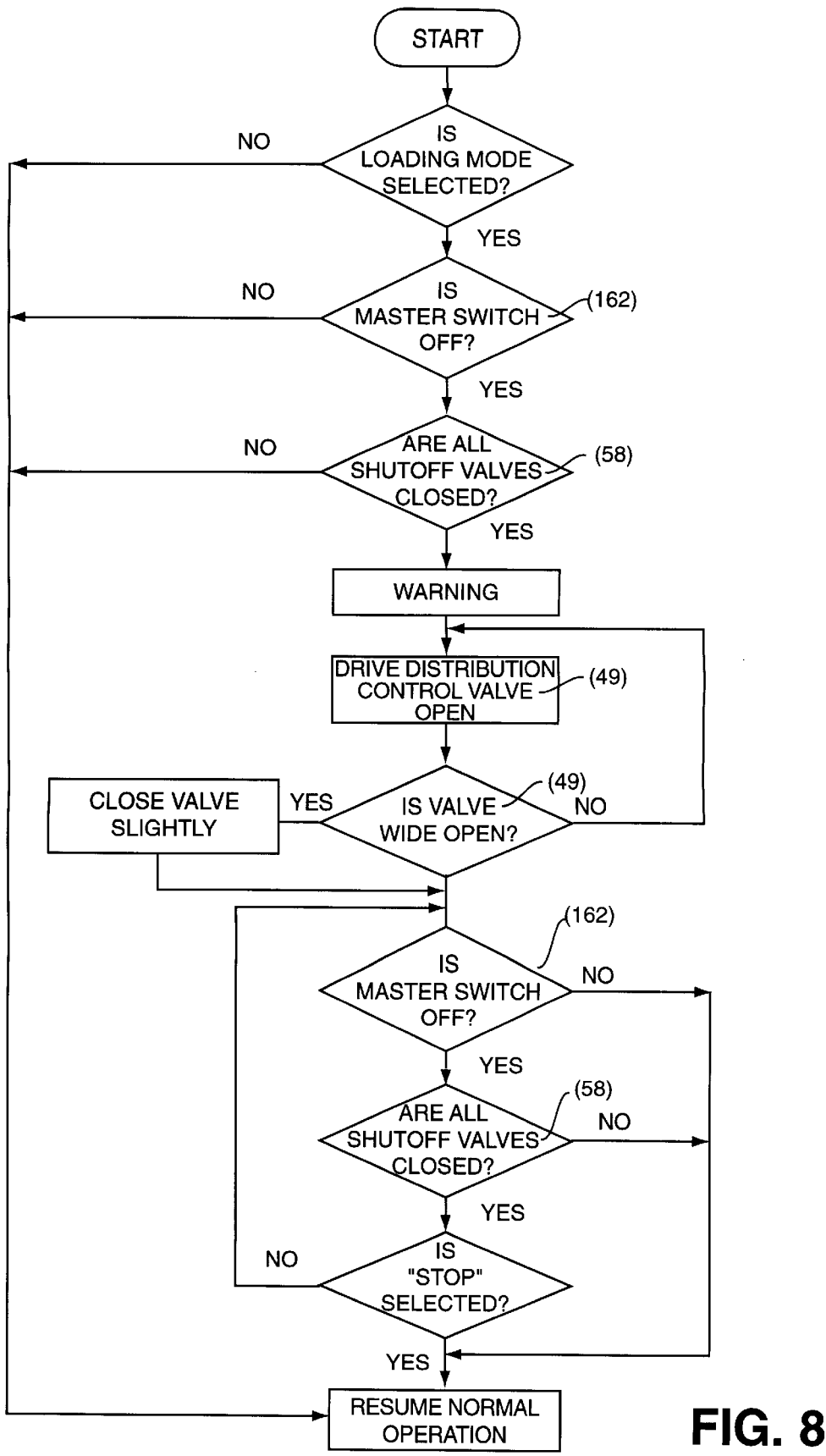
FIG. 8 is a flow chart illustrating a loading feature of the present invention.

In order to prevent the accidental dispersal of material through the booms 52, the control system 100 is programmed so that this loading feature may not be activated when the master switch module 162 is in the "auto" position or when the boom sensors 59 indicate that any of the shut-off valves 58 are open (i.e., when any of the associated boom sections 54 are enabled). In addition, once activated, the control system 100 will automatically terminate this loading function if any shut-off valves 58 are subsequently opened or if the master switch module 162 is subsequently placed in the "auto" position. The loading function can be implemented in the software of the control system 100 and, conceptually, is illustrated by the flow chart of FIG. 8.

In accordance with yet another important aspect of the present invention, the inventive control system 100 also includes an agitation feature which allows liquid material to be selectively agitated while the material distribution device 10, for example, is en route to an application site or is traversing a field. This agitation feature is especially useful for certain liquid materials which need to be mixed before discharge, such as suspensions.

When the shut-off valves 58 and valve 45a are closed, a product recirculation loop is formed along the outlet line 46 and the return line 47 of the liquid distribution systems 40 and 60. As shown in FIGS. 2B and 2C, this product recirculation loop starts at the product tank 42, proceeds through the outlet line 46 to a point 43 where the inlet line 44 and the outlet line 46 converge or intersect, and thereafter proceeds through the return line 47 and the sparge valve 47a to the product tank 42. In operation, liquid material continuously circulates through this product recirculation loop when the shut-off valves 58 and valve 45a, are closed and pump 48 or 68 is activated. In the case of a two-way valve (not shown) disposed at the junction of the inlet and outlet lines 44 and 46, liquid material continuously circulates through this product recirculation loop when the shut-off valves 59 are closed and the two-way valve is positioned such that the inlet line 44 is closed and the outlet line 46 is open. Of course, when some of the shut-off valves 58 are eventually re-opened, liquid material will then flow to the enabled boom sections 54 and out through the nozzles 56.

Figure 9:
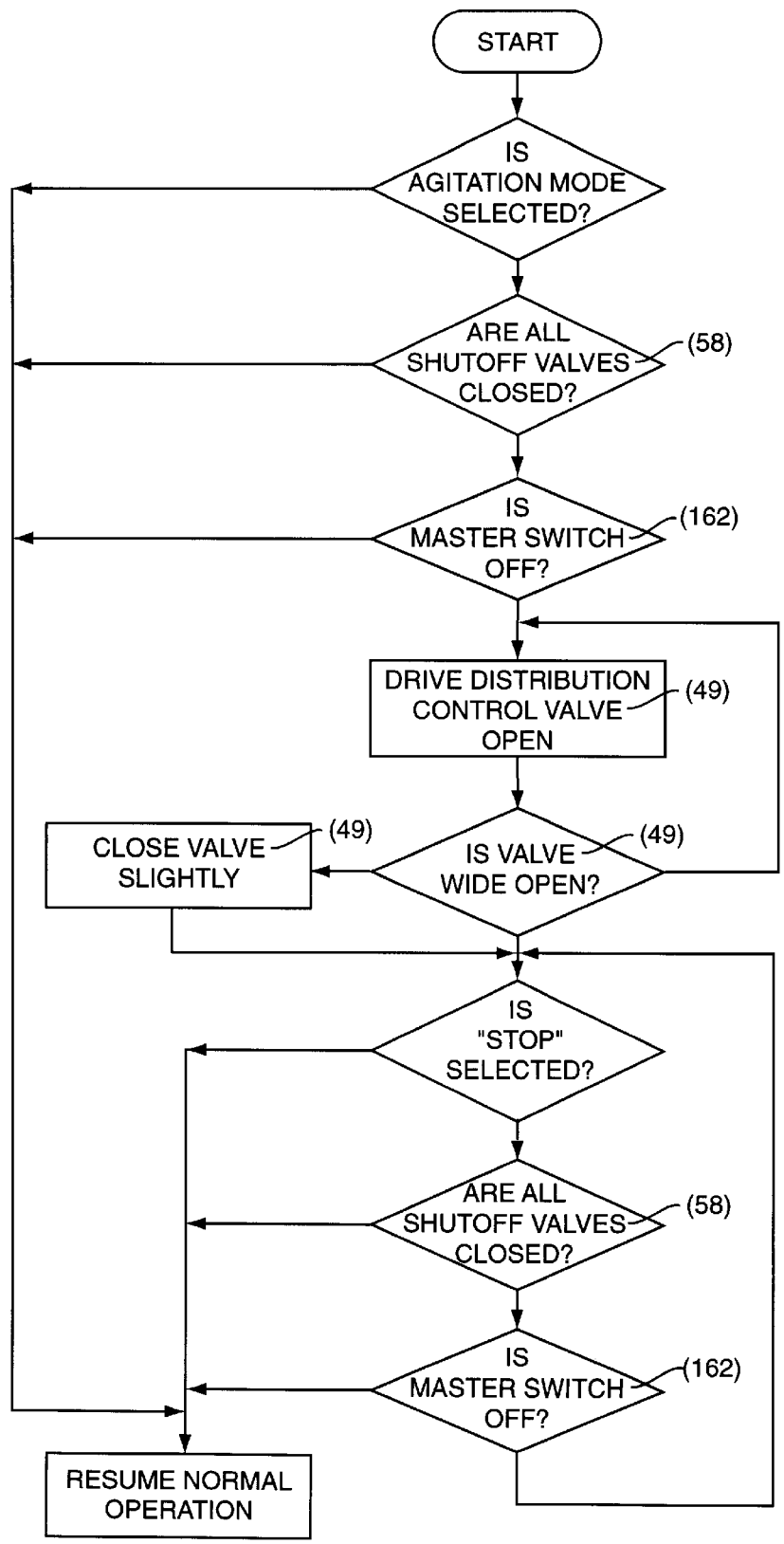
FIG. 9 is a flow chart illustrating an agitation feature of the present invention.

To initiate the agitation feature of the present invention, the operator simply closes valves 58 and 45a, enters the set-up mode of the control system 100 by activating the appropriate mode selection key 138–140 of the user console 110, and then selects the appropriate option from the menu displayed on the LCD panel 120 of the user console 110. Once selected, the control system 100 transmits an output signal to the actuation driver 251 instructing it to open the product distribution control valve 49 so that liquid material may be circulated through the product recirculation loop. This process continues until the control module 210 receives a signal from the boom sensors 59 indicating that one or more boom shut-off valves 58 are open, until the operator selects the "stop" option, or until the master switch module 162 is moved out of the "off" position. The agitation function can be implemented in the software of the control system 100 and, conceptually, is illustrated by the flow chart of FIG. 9.

In accordance with still another important aspect of the present invention, the inventive control system 100 also has an unloading feature which provides for the automatic, reliable, and rapid discharge of excess granular material from the product bin 82 of a granular product distribution system 80 in a safe manner. If, for example, excess granular material remains in the product bin 82 following the treatment of a field, this unloading feature permits the operator to position the product distribution implement 30 at a desired location and automatically unload the remaining material.

To initiate this unloading feature, the operator simply enters the set-up mode of the control system 100 by activating the appropriate mode selection key 138–140 of the user console 110 and then selects the appropriate option from the menu displayed on the LCD panel 120. Once selected, the control system 100 transmits an output signal to the actuation driver 251 instructing it to completely open the product distribution control valve 49. Once the control valve 49 is completely open, an error signal is sent to the control module 210 indicating a wide-open control valve 49 condition. In response to this error signal, the control system 100 closes the valve 49 slightly to remove this error condition. This unloading process continues until the operator selects the "stop" option (i.e., when the product bin 82 is empty).

Figure 10:
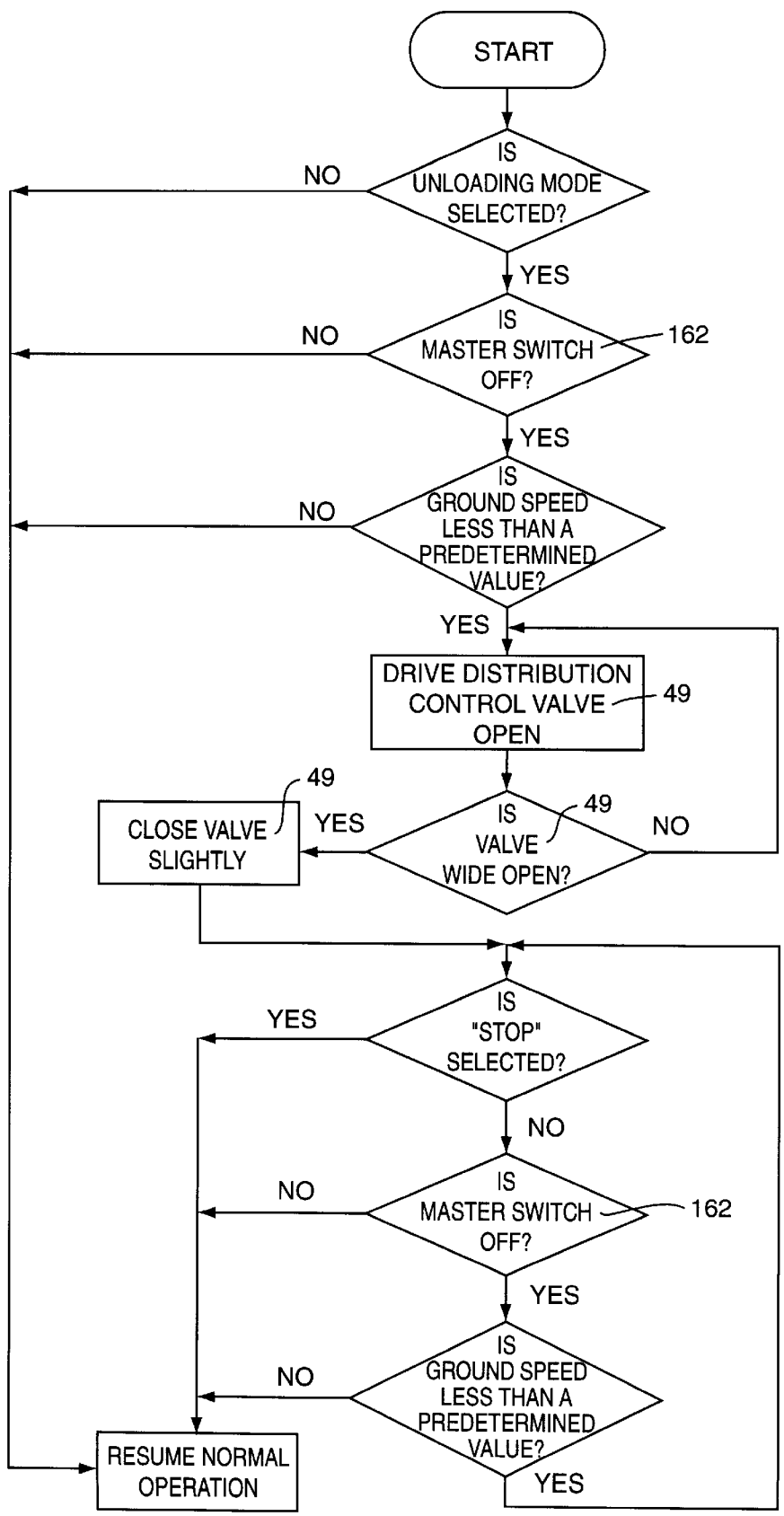
FIG. 10 is a flow chart illustrating an unloading feature of the present invention.

As a safety precaution, this loading feature may not be activated if the control system 100 detects that the ground speed of the material distribution device 10 is greater than a predetermined value, such as five miles-per-hour. This loading feature will also cease functioning if the master switch module 162 is moved out of the "off" position. In any event, the control system 100 only permits the discharge of material when the material distribution device 10 is either stationary or traveling at a low rate of speed. The unloading function can be implemented in the software of the control system 100 and, conceptually, is illustrated by the flow chart of FIG. 10.

While the present invention has been described and disclosed with an emphasis upon preferred embodiments and procedures, it will be understood, of course, that the present invention is not strictly limited thereto. Since modifications may be made to the structures and procedures disclosed herein—particularly in light of the foregoing teachings—without departing from the present invention, the following claims are intended to cover all structures that fall within the scope and spirit of the present invention.

What is claimed is:

1. A control system for regulating the operation of a mobile material distribution device, the material distribution device including a supply of material, a boom with at least one boom section, a shut-off valve associated with each boom section, and a control valve for regulating the flow of material to said at least one boom section, said at least one boom section including at least one outlet duct for dispensing material therefrom, the control valve being movable into a plurality of controlled positions, each controlled position providing a material dispersal rate through said at least one outlet duct, the control system comprising:

a boom sensing input for monitoring the operational status of each boom section; and a processing system for maintaining a substantially stable pressure level between the control valve and each shut-off valve by positionally locking the control valve at its last controlled position upon receiving a signal from the boom sensing input indicating the shut-off valve associated with each boom section is closed.

2. The control system set forth in claim 1, wherein the processing system includes:

a user console including a display device for visually displaying information concerning the control system and the material distribution device and further including at least one input device for entering data into the control system; and a control module for receiving input signals from the boom sensing input and other feedback sensors associated with the material distribution device, for transmitting performance information to the user console, and for generating output signals which regulate the control valve.

3. The control system set forth in claim 2, wherein the user console and the control module are contained within a single housing.

4. The control system set forth in claim 2, wherein the user console and the control module are connected via a communication link.

5. The control system set forth in claim 4, wherein the communication link is a bus having a connector for selectively attaching and detaching the control module to the user console.

6. The control system set forth in claim 1, wherein the material is in liquid form and the outlet ducts are nozzles.

7. The control system set forth in claim 6, further comprising:

a pump arranged between the supply of material and the shut-off valve for pressurizing the liquid material.

8. The control system set forth in claim 7, wherein the supply of material is contained within a product tank, and wherein material from an external supply source is drawn into the product tank by the pump.

9. The control system set forth in claim 7, wherein the pump is a variable-speed pump connected to a hydraulic motor, the hydraulic motor being disposed in a hydraulic loop which includes the control valve, the control valve regulating the operating speed of the hydraulic motor.

10. The control system set forth in claim 9, wherein the supply of material is contained within a product tank, and wherein material from an external supply source is drawn into the product tank by the pump.

11. The control system set forth in claim 1, further comprising:

a feedback sensor disposed downstream of the control valve and operatively connected to the control module for monitoring a parameter indicative of the material dispersal rate.

12. The control system set forth in claim 11, wherein the parameter indicative of the material dispersal rate is pressure and the feedback sensor is a pressure transducer.

13. The control system set forth in claim 1, further comprising:

a feedback sensor disposed upstream of the control valve and operatively connected to the control module for monitoring a parameter indicative of the material dispersal rate.

14. The control system set forth in claim 13, wherein the parameter indicative of the material dispersal rate is flow and the feedback sensor is a flowmeter.

15. The control system set forth in claim 6, wherein the material distribution device includes an outlet line which connects the supply of material and said at least one boom section, a pump disposed along the outlet line, an inlet line which intersects the outlet line at a point between the pump and the supply of material, a return line which connects the supply of material and the outlet line at a point downstream of the pump, and at least one valve for selectively closing either the inlet line or the outlet line.

16. The control system set forth in claim 15, wherein the pump circulates liquid material in a product recirculation loop when said at least one valve is positioned so that the inlet line is closed and the outlet line is open, the shut-off valve associated with each boom section is closed, and the control module transmits an output signal to the control valve instructing it to open, the product recirculation loop comprising the return line, the supply of material, the pump, and at least a portion of the outlet line.

17. The control system set forth in claim 1, further comprising:

a speed sensor for monitoring the ground speed of the material distribution device.

18. The control system set forth in claim 17, wherein the control module maintains the material dispersal rate per unit area covered through each enabled boom section at a substantially uniform level by selectively adjusting the control valve in response to information received from the boom sensing input.

19. A method of regulating the material dispersal rate from a mobile material distribution device, the material distribution device including a supply of material, a boom with at least one boom section, a shutoff valve associated with each boom section, and a control valve for regulating the flow of material to said at least one boom section, said at least one boom section including at least one outlet duct for dispensing material therefrom, the control valve being movable into a plurality of controlled positions, each controlled position providing a material dispersal rate through said at least one outlet duct, the method comprising the steps of:

monitoring the operational status of each boom section; and positionally locking the control valve at its last controlled position upon receiving a signal from each boom section indicating the shut-off valve associated with each boom section is closed.

20. A method of operating a mobile material distribution device comprising the following steps:

moving the device over a first area of ground at a speed which may change;

dispersing a material from at least one boom section on the device while the device is moving over said first area of ground;

continuously supplying said material to said boom section, via a line from a container on the device to said boom section, at a flow rate which is a function of the speed of the device while said material is dispersing;

controlling said rate by controlling a control valve having a plurality of controlled positions;

closing a shut-off valve disposed in said line to stop the flow of material to said boom section;

positionally locking said control valve at its last controlled position as a result of the shut-off valve closing;

moving the device over a second area of ground over which no material is dispersed from said boom section;

re-opening said shut-off valve to resume dispersing material from said boom section; and unlocking said control valve as a result of said shut-off valve re-opening to resume controlling said rate by controlling said control valve.

* * * * *